US012391515B2

(12) United States Patent
Ota

(10) Patent No.: US 12,391,515 B2
(45) Date of Patent: Aug. 19, 2025

(54) ELEVATOR SYSTEM, ELEVATOR CONTROL METHOD, AND NON-TRANSITORY COMPUTER-READABLE MEDIUM

(71) Applicant: CANON KABUSHIKI KAISHA, Tokyo (JP)

(72) Inventor: Chihiro Ota, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 1322 days.

(21) Appl. No.: 17/091,292

(22) Filed: Nov. 6, 2020

(65) Prior Publication Data
US 2021/0147175 A1 May 20, 2021

(30) Foreign Application Priority Data
Nov. 20, 2019 (JP) ................... 2019-209829

(51) Int. Cl.
| B66B 1/28 | (2006.01) |
| B66B 1/24 | (2006.01) |
| B66B 1/34 | (2006.01) |
| B66B 3/00 | (2006.01) |
| G05B 13/02 | (2006.01) |

(Continued)

(52) U.S. Cl.
CPC .............. *B66B 1/28* (2013.01); *B66B 1/2408* (2013.01); *B66B 1/3476* (2013.01); *B66B 3/002* (2013.01); *G05B 13/0265* (2013.01); *G05B 19/4155* (2013.01); *G06N 7/01* (2023.01); *G06N 20/00* (2019.01); *B66B 2201/222* (2013.01); *B66B 2201/223* (2013.01); *B66B 2201/23* (2013.01);

(Continued)

(58) Field of Classification Search
CPC ....... B66B 1/28; B66B 1/2408; B66B 1/3476; B66B 3/002; B66B 2201/235; B66B 2201/22; B66B 2201/222; B66B 2201/223; B66B 2201/23; B66B 2201/4661; G05B 19/4155; G05B 2219/45014; G05B 13/0265; G06N 7/01; G06N 20/00; G06N 3/084
See application file for complete search history.

(56) References Cited

U.S. PATENT DOCUMENTS 5,182,776 A * 1/1993 Suzuki .................. B66B 1/3415
348/143
5,306,878 A * 4/1994 Kubo .................... B66B 1/2458
187/247

(Continued)

FOREIGN PATENT DOCUMENTS

JP      2013173594 A    9/2013

*Primary Examiner* — Jason H Duger
(74) *Attorney, Agent, or Firm* — ROSSI, KIMMS & McDOWELL LLP

(57) ABSTRACT

An elevator system is provided. The system comprises a first acquisition unit that acquires an image in a car of an elevator and an image of a landing of the elevator; a first generation unit that generates first learning data from the acquired images; a learning unit that performs learning using the first learning data, thereby generating a first learned model; a second generation unit that generates input data from a new image; an estimation unit that estimates, by applying the input data to the first learned model, whether the person on the landing of the elevator, which is included in the new image, gets in the elevator; and a control unit that controls an operation of the elevator based on an estimation result.

8 Claims, 19 Drawing Sheets

(51) Int. Cl.
  *G05B 19/4155*   (2006.01)
  *G06N 7/01*      (2023.01)
  *G06N 20/00*     (2019.01)
  *G06N 3/084*     (2023.01)

(52) U.S. Cl.
  CPC . *B66B 2201/235* (2013.01); *B66B 2201/4661* (2013.01); *G05B 2219/45014* (2013.01); *G06N 3/084* (2013.01)

(56) References Cited

U.S. PATENT DOCUMENTS

| | | | | |
|---|---|---|---|---|
| 5,354,957 | A * | 10/1994 | Robertson | B66B 1/2458 187/387 |
| 5,672,853 | A * | 9/1997 | Whitehall | B66B 1/2408 187/382 |
| 5,717,832 | A * | 2/1998 | Steimle | G06V 10/764 706/41 |
| 5,923,004 | A * | 7/1999 | Whitehall | B66B 1/2408 187/382 |
| 2003/0221915 | A1* | 12/2003 | Brand | B66B 1/2458 187/382 |
| 2005/0173200 | A1* | 8/2005 | Cook | B66B 13/26 187/316 |
| 2009/0057068 | A1* | 3/2009 | Lin | B66B 1/468 187/392 |
| 2009/0236185 | A1* | 9/2009 | Yumura | B66B 13/26 187/317 |
| 2019/0161318 | A1* | 5/2019 | Wedzikowski | B66B 1/2408 |
| 2019/0382233 | A1* | 12/2019 | Pusala | B66B 1/2458 |

* cited by examiner

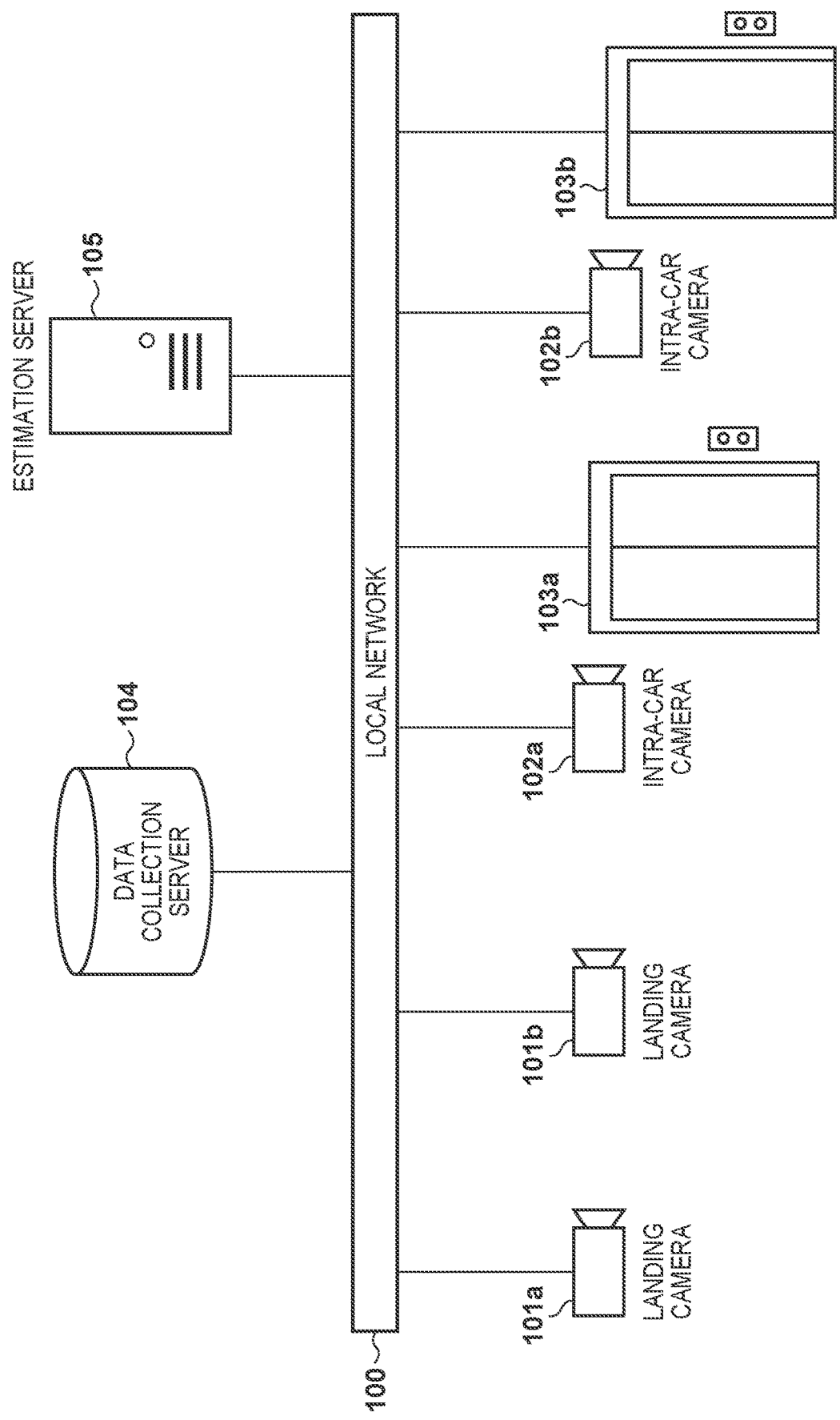

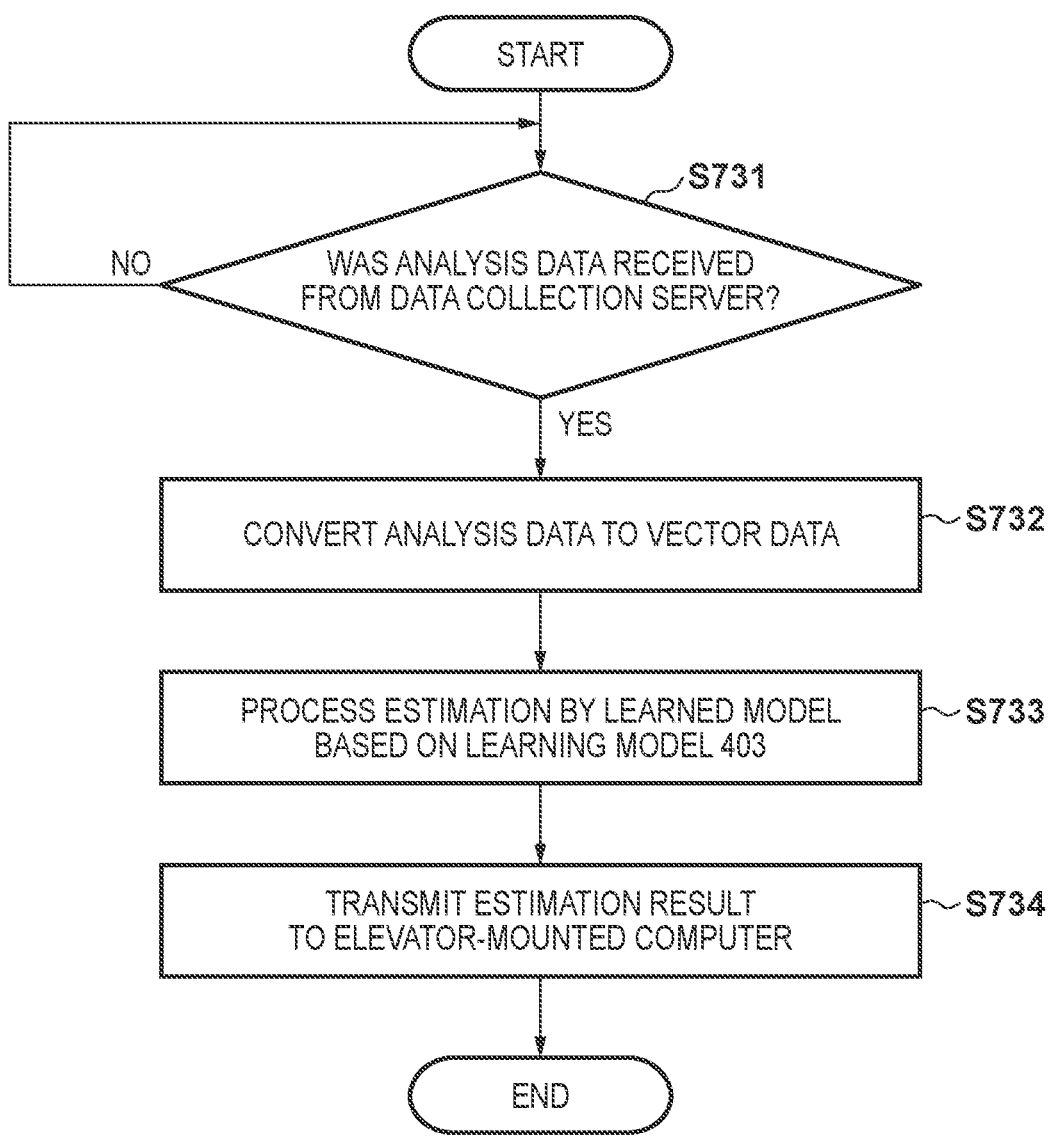

ELEVATOR SYSTEM, ELEVATOR CONTROL METHOD, AND NON-TRANSITORY COMPUTER-READABLE MEDIUM

BACKGROUND OF THE INVENTION

Field of the Invention

The present invention relates to an elevator system, an elevator control method, and a non-transitory computer-readable medium.

Description of the Related Art

In a building equipped with an elevator, congestion in the elevator is a problem to be solved. Japanese Patent Laid-Open No. 2013-173594 discloses an elevator system that performs an efficient operation by including a group management apparatus configured to predict which elevator should be dispatched to which calling floor.

On the other hand, there also exists a cause of congestion that cannot be solved only by optimizing the car assigned to the calling floor. More specifically, even if the car stops at the calling floor and opens the door, in some cases, a waiting passenger on the calling floor does not get in. This increases unnecessary stops and lowers the transport efficiency of the elevator, resulting in congestion. To avoid such an unnecessary stop, it is necessary to predict, for each calling floor, whether a waiting passenger gets in the car of the elevator, thereby judging whether to stop the car at the calling floor and controlling the operation of the elevator.

Whether the waiting passenger who has called the car gets in the car that has stopped at the landing is affected by the relationship between the number of waiting passengers on the landing and the features of these and the number of passengers in the car and the features of these. For example, if the car is crowded with many passengers, a waiting passenger abandons getting in at high possibility although he/she has called the car. There also exist cases in which a waiting passenger hesitates getting in because of the combination of the waiting passenger and passengers, for example, a case in which the waiting passenger is a female, and the passengers are a plurality of males, or a case in which the waiting passenger is short, and the passengers are tall. Hence, to predict whether the waiting passenger gets in, it is necessary to grasp the features of the waiting passenger and the passengers and make a prediction from the information.

Whether the waiting passenger gets in is also affected by the use purpose of the elevator and the place and cultural region where the elevator is installed in addition to the features of passengers in the car and waiting passengers on the calling floor landing. Hence, the criterion to judge whether a waiting passenger gets in changes on an elevator basis.

SUMMARY OF THE INVENTION

In consideration of the above-described problem, the present invention improves the operation efficiency of an elevator based on the feature and situation of a waiting passenger or a passenger of an elevator.

The present invention has the following arrangement. According to one aspect pf the present invention, provided is an elevator system comprising: at least one processor and at least one memory coupled to each other and, when a program stored in the at least one memory is executed by the at least one processor, the at least one processor acts as: a first acquisition unit configured to acquire an image in a car of an elevator and an image of a landing of the elevator; a first generation unit configured to generate first learning data from the images acquired by the first acquisition unit; a learning unit configured to perform learning using the first learning data, thereby generating a first learned model used to estimate whether a person on the landing of the elevator gets in the elevator; a second generation unit configured to generate input data from a new image acquired by the first acquisition unit; an estimation unit configured to estimate, by applying the input data to the first learned model, whether the person on the landing of the elevator, which is included in the new image, gets in the elevator; and a control unit configured to control an operation of the elevator based on an estimation result of the estimation unit.

According to the present invention, it is possible to improve the operation efficiency of an elevator.

Further features of the present invention will become apparent from the following description of exemplary embodiments with reference to the attached drawings.

BRIEF DESCRIPTION OF THE DRAWINGS

FIG. 1 is a view showing an example of the overall arrangement of an elevator system according to an embodiment of the present invention;

FIG. 7D is a flowchart showing estimation processing of the elevator system according to the first embodiment;

DESCRIPTION OF THE EMBODIMENTS

Figure 2A:
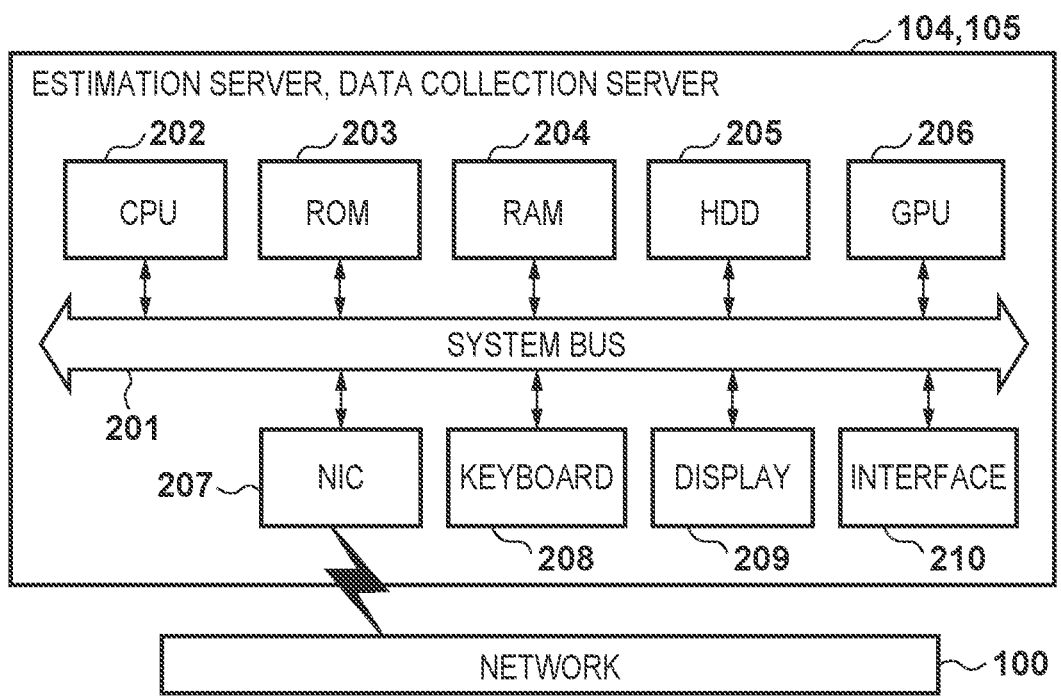
FIGS. 2A, 2B, and 2C are block diagrams showing examples of the hardware arrangements of apparatuses that form the elevator system according to an embodiment of the present invention.

Hereinafter, embodiments will be described in detail with reference to the attached drawings. Note, the following embodiments are not intended to limit the scope of the claimed invention. Multiple features are described in the embodiments, but limitation is not made an invention that requires all such features, and multiple such features may be combined as appropriate. Furthermore, in the attached drawings, the same reference numerals are given to the same or similar configurations, and redundant description thereof is omitted.

First Embodiment

[System Arrangement]
FIG. 1 is a view showing an example of the overall arrangement of an elevator system according to an embodiment of the present invention. Referring to FIG. 1, a data collection server 104, an estimation server 105, landing cameras 101a and 101b, intra-car cameras 102a and 102b, and elevator-mounted computers 103a and 103b are communicably connected via a network 100. The network 100 is a so-called communication network implemented by, for example, a LAN such as the Internet, a WAN, a telephone line, a dedicated digital line, an ATM, a frame relay line, a cable television line, or a data broadcasting wireless line. The network 100 need only be able to transmit/receive data. In this embodiment, the network 100 is a network in a building in which an elevator is installed.

The landing cameras 101a and 101b are cameras installed on the landings of elevators in the floors of the building. A description will be made assuming that one camera is installed on the landing of each floor as the landing cameras 101a and 101b. However, a plurality of cameras may be provided on one landing. The intra-car cameras 102a and 102b are cameras installed in the cars of the elevators in the building. A description will be made assuming that the cameras have the same function but are installed in difference places. These cameras are connected to the network 100, capture waiting passengers on the landings and passengers in the cars, and transmit images to the data collection server 104. Note that in this embodiment, the inside of an elevator that a person boards will be referred to as a "car".

Each of the data collection server 104 and the estimation server 105 is an information processing apparatus, and is executed on a server computer. The data collection server 104 and the estimation server 105 may be implemented by the same apparatus, although these are separately shown in FIG. 1. Alternatively, one server may be formed by a plurality of apparatuses from the viewpoint of load distribution or the like.

The data collection server 104 receives the images of the waiting passengers and the passengers, which are captured by the cameras, and analyzes the images. By the image analysis, the data collection server 104 extracts the features of the waiting passenger and the passengers captured in the images. The extracted features are used by the estimation server 105 to predict whether the waiting passengers get in the cars. As feature information used for prediction in this embodiment, pieces of attribute information of a person such as a sex, height, age, group, body direction, and clothes, which are factors affecting a person distance are used. In addition to these, date/time information, the cultural region of the elevator installation place, the number of waiting passengers and the number of passengers, the presence/absence of an animal accompanying each user, and an image in each car are used together for prediction. Note that the pieces of information used here as the factors affecting the person distance are merely examples, and another information may be used.

The estimation server 105 has a function of receiving the features of the waiting passengers and the passengers from the data collection server 104, and estimating, based on the features, whether the waiting passengers on the floor of interest get in the car in this situation. The estimation result of estimation processing by the estimation server 105 is transmitted to the elevator-mounted computers 103a and 103b.

Each of the elevator-mounted computers 103a and 103b is a computer configured to control the operation of a general elevator (car), and a detailed description thereof will be omitted here. The elevator-mounted computers 103a and 103b each control ascending/descending (operation) of the car to each floor in accordance with a user operation on each floor of the building. FIG. 1 shows two elevators as an example, and the number of elevators may be increased/decreased. The elevator-mounted computers 103a and 103b need not always be mounted in individual elevators and may be installed as a computer system that controls a plurality of elevators as a whole.

The function of a server to be described below in this embodiment may be implemented by a single server or a virtual server, or may be implemented by a plurality of servers or a plurality of virtual servers. Alternatively, a plurality of virtual servers may be executed on a single server. In the following explanation, concerning the landing cameras 101, intra-car cameras 102, and the elevator-mounted computers 103, the suffixes "a" and "b" will be omitted when comprehensively making a description, and the suffixes will be added when a description is individually needed.

[Hardware Arrangement]
FIG. 2A is a block diagram showing an example of the hardware arrangement of the data collection server 104 and the estimation server 105 according to this embodiment. In this embodiment, the data collection server 104 and the estimation server 105 will be described as information processing apparatuses having the same hardware arrangement, but these may have different arrangements.

Referring to FIG. 2A, a CPU (Central Processing Unit) 202 controls the entire apparatus. The CPU 202 performs control of executing application programs, an OS (Operating System), and the like stored in an HDD (Hard Disc Drive) 205 and temporarily storing information, files, and the like necessary for execution of programs in a RAM (Random Access Memory) 204. A GPU (Graphic Processing Unit) 206 performs processing in a case in which learning is performed a plurality of times using a learning model of machine learning such as deep learning. When the GPU 206 is used, more data can be processed in parallel, and an efficient operation can be performed. When learning is performed a plurality of times using a learning model of machine learning such as deep learning, performing processing by the GPU 206 is effective. In this embodiment, in addition to the CPU 202, the GPU 206 is used for learning processing. More specifically, when executing a learning program including a learning model, the CPU 202 and the GPU 206 cooperatively perform an operation, thereby performing learning. Note that in the learning processing, the operation may be performed only by the CPU 202 or the GPU 206. In addition, estimation processing to be described later may also be performed using the GPU 206, like the learning processing.

A ROM (Read Only Memory) 203 is a storage unit and functions as a main memory, a work area, and the like for the CPU 202 and the GPU 206. The HDD 205 is one of external storage units, functions as a mass storage memory, and stores application programs such as a web browser (not shown), programs of a service server group, an OS, associated programs, and the like. A display 209 is a display unit, and displays a command and the like input from a keyboard 208. An interface 210 is an external device I/F (interface), and connects a USB device or a peripheral device. The keyboard 208 is an instruction input means. A system bus 201 controls the flow of data in the apparatus. A NIC (Network Interface Card) 207 exchanges data with an external device via the network 100.

Figure 3:
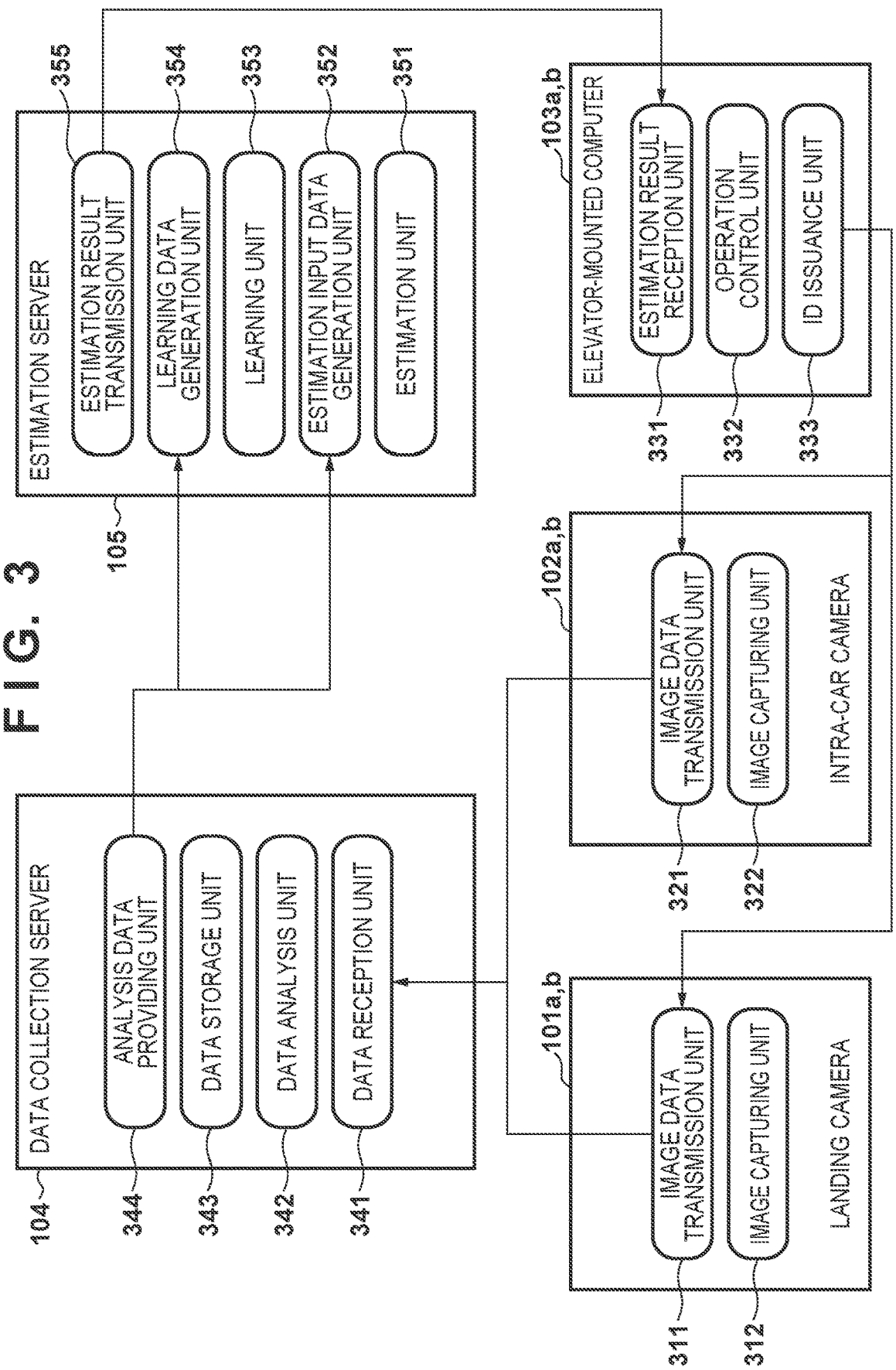
FIG. 3 is a block diagram showing an example of the software configuration of the elevator system according to an embodiment of the present invention.

Note that the arrangement of the computer is merely an example, and is not limited to the arrangement example shown in FIG. 2A. For example, the storage destination of data and programs can also be changed between the ROM 203, the RAM 204, and the HDD 205 in accordance with features. When the CPU 202 and the GPU 206 execute processing based on a program stored in the HDD 205, processing in a software configuration as shown in FIG. 3 is implemented.

Figure 2B:
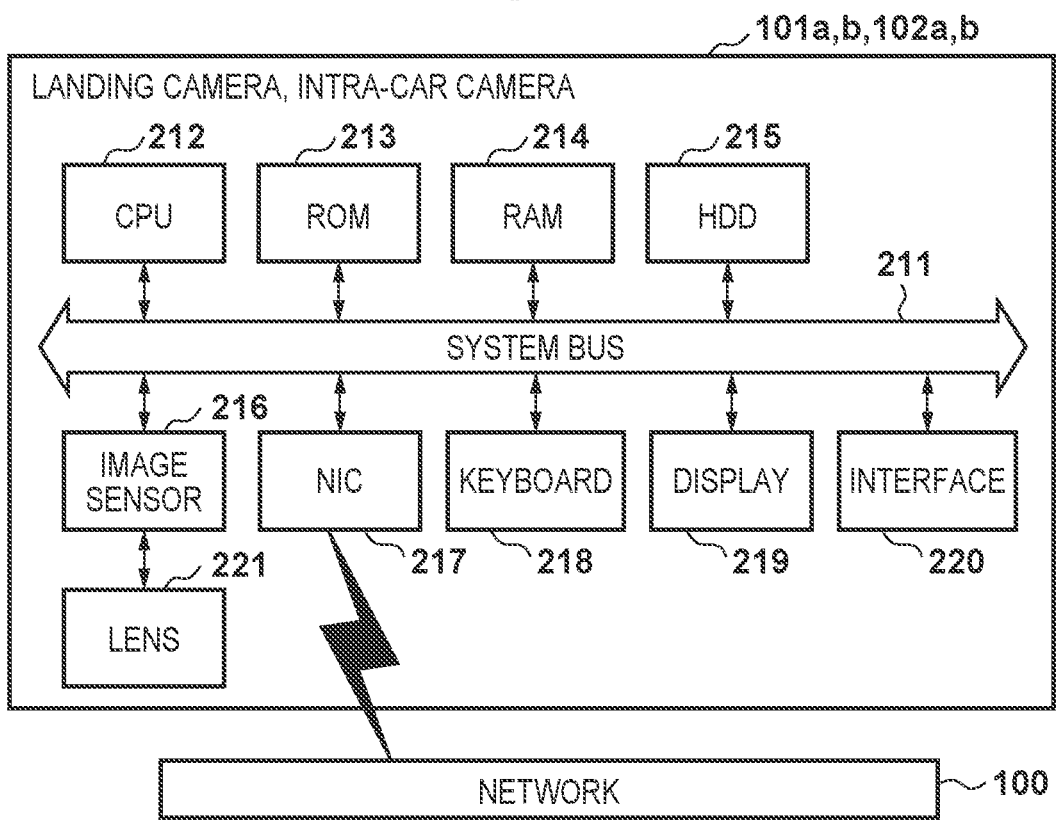

FIG. 2B is a block diagram showing an example of the hardware arrangement of the landing camera 101 and the intra-car camera 102 according to this embodiment. In this embodiment, a description will be made assuming that the landing camera 101 and the intra-car camera 102 have the same hardware arrangement, but these may have different arrangements.

Referring to FIG. 2B, a CPU 212 controls the entire apparatus. The CPU 212 performs control of executing application programs, an OS, and the like stored in an HDD 215 and temporarily storing information, files, and the like necessary for execution of programs in a RAM 214. A ROM 213 is a nonvolatile storage unit and functions as a main memory, a work area, and the like for the CPU 212. The HDD 215 is one of external storage units, functions as a mass storage memory, and stores application programs, programs of a service server group, an OS, associated programs, and the like.

A display 219 is a display unit, and displays a command and the like input from a keyboard 218. An interface 220 is an external device I/F, and connects a USB device or a peripheral device. The keyboard 218 is an instruction input unit. A system bus 211 controls the flow of data in the apparatus. A NIC 217 exchanges data with an external device via the network 100. A lens 221 is a lens used to capture an image. Light input via the lens 221 is read by an image sensor 216, and the result of reading by the image sensor 216 is stored in the HDD 215, thereby recording an image. An image here may include both a still image and a moving image. These will collectively be referred to as an "image" or "image data" hereinafter.

Note that the arrangement of the camera is merely an example, and is not limited to the arrangement example shown in FIG. 2B. For example, the storage destination of data and programs can also be changed between the ROM 213, the RAM 214, and the HDD 215 in accordance with features. In addition, when the CPU 212 executes processing based on a program stored in the HDD 215, processing in a software configuration as shown in FIG. 3 is implemented. Also, the keyboard 218 and the display 219, which function as input/output units for the user, need not always be provided in an installed type camera.

Figure 2C:
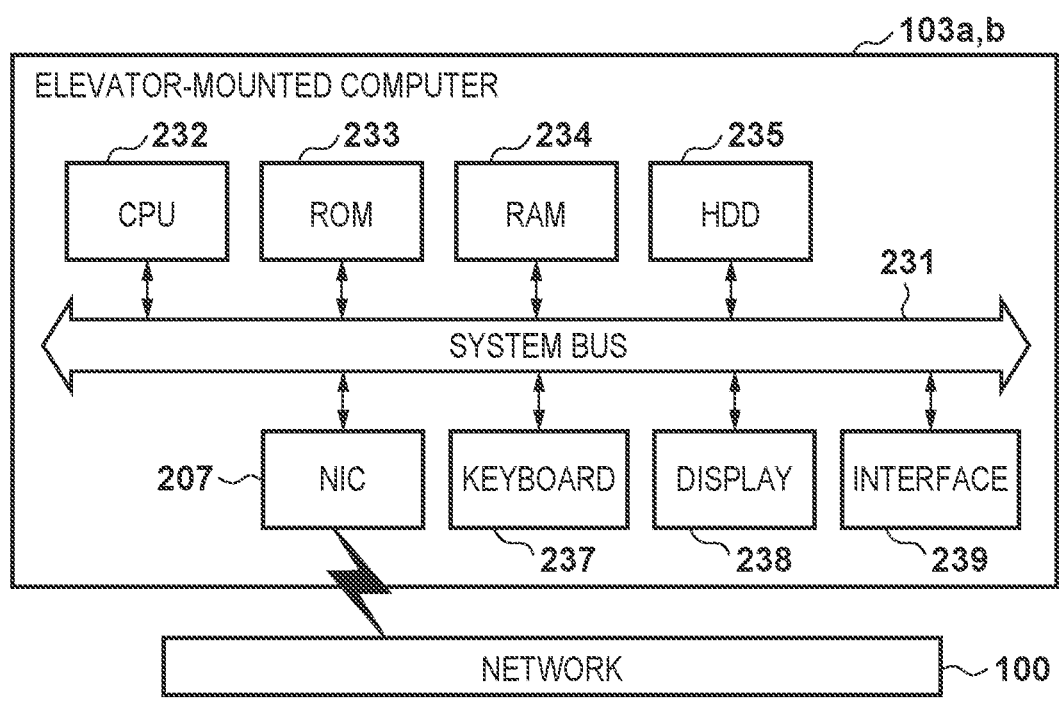

FIG. 2C is a block diagram showing an example of the hardware arrangement of the elevator-mounted computer 103 according to this embodiment. Here, one elevator-mounted computer 103 is provided in correspondence with one elevator.

Referring to FIG. 2C, a CPU 232 controls the entire apparatus. The CPU 232 performs control of executing application programs, an OS, and the like stored in an HDD 235 and temporarily storing information, files, and the like necessary for execution of programs in a RAM 234. A ROM 233 is a nonvolatile storage unit and functions as a main memory, a work area, and the like for the CPU 232. The HDD 235 is one of external storage units, functions as a mass storage memory, and stores application programs, programs of a service server group, an OS, associated programs, and the like.

A display 238 is a display unit, and displays a command and the like input from a keyboard 237. An interface 239 is an external device I/F, and connects a USB device or a peripheral device. The keyboard 237 is an instruction input unit. A system bus 231 controls the flow of data in the apparatus. A NIC 236 exchanges data with an external device via the network 100.

Note that the arrangement of the elevator-mounted computer 103 is merely an example, and is not limited to the arrangement example shown in FIG. 2C. For example, the storage destination of data and programs can also be changed between the ROM 233, the RAM 234, and the HDD 235 in accordance with features. In addition, when the CPU 232 executes processing based on a program stored in the HDD 235, processing in a software configuration as shown in FIG. 3 is implemented. Also, the keyboard 237 and the display 238, which function as input/output units for the user, need not always be provided.

[Software Configuration]

FIG. 3 is a block diagram showing an example of a software configuration of excerpt functions according to this embodiment in the elevator system according to this embodiment. Each part is implemented when the CPU of each apparatus reads out a program stored in the storage unit and executes it.

The landing camera 101 and the intra-car camera 102 are configured to include the image capturing units 312 and 322 and image data transmission units 311 and 321, respectively. Each of the image capturing units 312 and 322 converts light input via the lens 221 and the image sensor 216 into an image signal and stores it in the HDD 215. Image capturing by the image capturing units 312 and 322 may be performed at a predetermined time interval or at a timing when an elevator use instruction is input by a user operation.

Figure 11A:
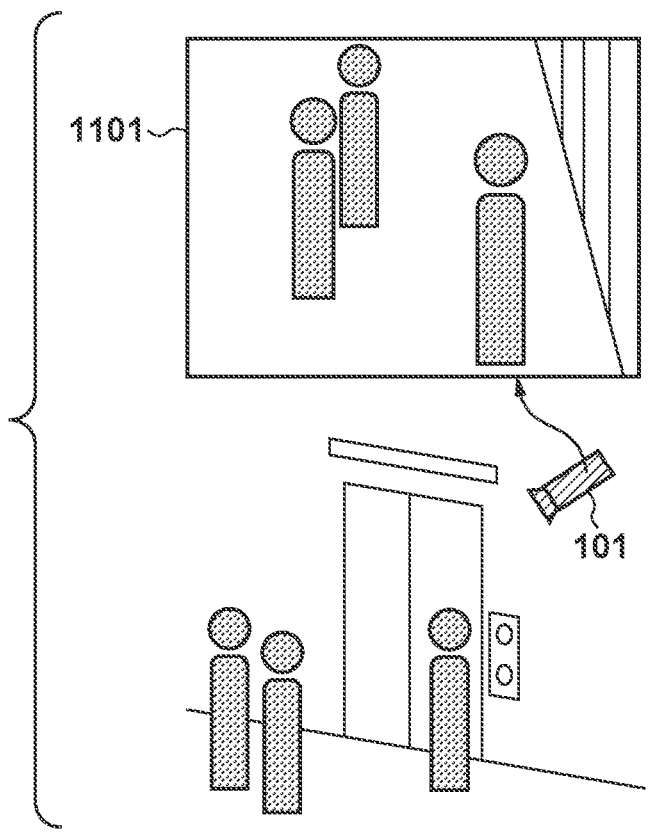
FIGS. 11A and 11B are views for explaining captured images of cameras according to an embodiment of the present invention.
Figure 11B:
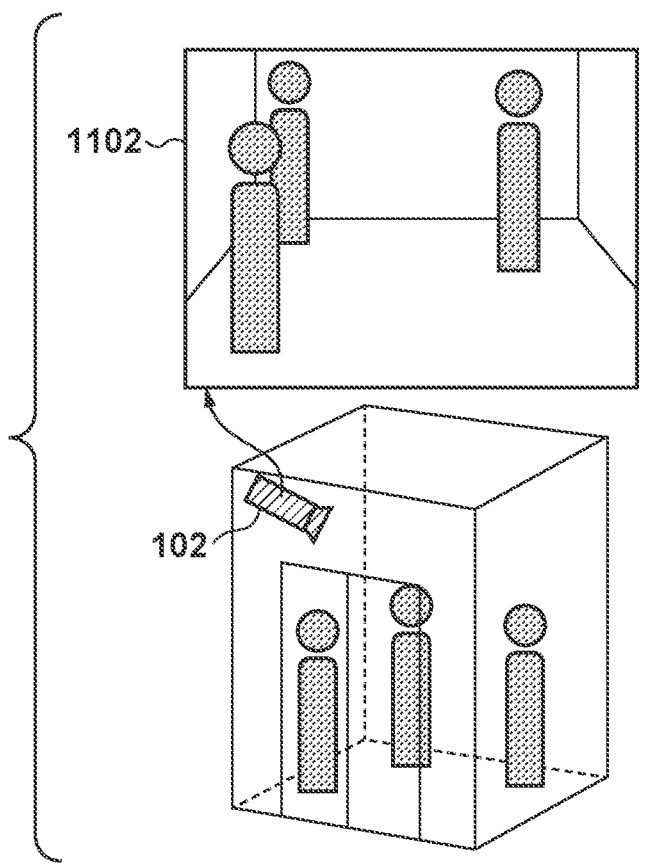

FIGS. 11A and 11B show the captured images of the cameras according to this embodiment. FIG. 11A shows a captured image 1101 as an example of an image obtained by capturing a landing by the landing camera 101. On the other hand, FIG. 11B shows a captured image 1102 as an example of an image obtained by capturing the inside of the car of an elevator by the intra-car camera 102. Although examples of still images are shown here, moving images may be held as described above.

The image data transmission units 311 and 321 associate image signals converted by the image capturing units 312 and 322 with an ID received from an ID issuance unit 333 of the elevator-mounted computer 103, and transmit the signals to the data collection server 104.

The elevator-mounted computer 103 is configured to include an estimation result reception unit 331, an operation control unit 332, and the ID issuance unit 333. The estimation result reception unit 331 receives an estimation result representing whether a waiting passenger gets in the car from an estimation result transmission unit 355 of the estimation server 105. The operation control unit 332 receives the above-described estimation result from the estimation result reception unit 331, and decides, based on the information, whether to stop the car of the elevator at a calling floor. A floor where an elevator calling operation is performed by a user operation or the like will be referred to as a "calling floor" hereinafter. Every time the car is called, the ID issuance unit 333 issues an ID (identification information) used to uniquely identify a series of processes from the call to get-in/get-off. Also, the ID issuance unit 333 transmits the issued ID to the image data transmission units 311 and 321 of the landing camera 101 and the intra-car camera 102.

The data collection server 104 is configured to include a data reception unit 341, a data analysis unit 342, a data storage unit 343, and an analysis data providing unit 344. The data reception unit 341 receives the image signals from the image data transmission unit 311 of the landing camera 101 and the image data transmission unit 321 of the intra-car camera 102. The data analysis unit 342 analyzes image data received via the data reception unit 341.

In this embodiment, the following three analysis data are analyzed and created by the data analysis unit 342. The first data is a feature extracted concerning each of waiting passengers included in the image of the landing and passengers included in the image of the inside of the car, which are captured before arrival of the car at the calling floor. The second data is arrangement data that identifies, by image recognition, a region where a person or an object exists and a region where neither a person nor an object exists in image data in the car captured by the intra-car camera 102, and represents whether a person or an object exists for each pixel of the image. The third data is information representing whether a waiting passenger has got in the car based on a video of a get-in/get-off state of users, which is captured after the arrival of the car at the calling floor. The third data is data captured by the intra-car camera 102 only in the learning stage, and is therefore analyzed only in the learning stage.

The first analysis data will be described. The data analysis unit 342 extracts a feature for each person included in an image from images of waiting passengers and passengers received via the data reception unit 341, and records the features in the data storage unit 343. Table 1 shows an example of the configuration of data managed by the data storage unit 343 according to this embodiment.

An ID column represents a unique ID (identification information) for each processing from a call to get-in/get-off. Identical IDs indicate the same processing of an elevator from a call to get-in/get-off. For example, rows having the same ID in Table 1 represent an analysis result of data obtained by the same series of procedures from a call to get-in/get-off. An image capturing camera column represents whether an analysis result is obtained from an image captured by the landing camera 101 or obtained from an image captured by the intra-car camera 102. A Person_ID is an ID (identification information) uniquely representing a person extracted from an image. A sex column, a height column, an age column, a group column, a body direction column, a clothes column, an animal accompanying column represent results obtained by estimating a sex, height, age, group, body direction, clothes category, and the presence/absence of an accompanying animal for a person extracted from an image.

The above-described values will be described using detailed examples. If the sex column is "male" or "female", it represents that the estimation result of the sex of a target person by the data analysis unit 342 is a male or a female. If the height column is "165", it represents that the estimation result of the height of a target person by the data analysis unit 342 is 165 cm. If the age column is "26", it represents that the estimation result of the age of a target person by the data analysis unit 342 is 26. The group column represents whether waiting passengers or passengers form a group, and also represents, if they form a group, to which group each person belongs. If the group column is "0", it represents that a person does not form a group. If the value is other than "0", it represents that a person belongs to the same group as that of a person who has the same value in the group column.

If the body direction column is "12", it represents that the estimation result of the angle of the direction of the body of a target person by the data analysis unit 342 is 12° when the angle of the direction of the body of the target person standing perpendicular to the door of the elevator is defined as 0°. The clothes column represents the category of the clothes of a target person. If the value of the clothes column is "formal", it represents that the estimation result of the clothes category of a target person by the data analysis unit 342 is formal. Note that the clothes category is not particularly limited, and a plurality of categories are provided in advance. The animal accompanying column represents whether a target person is accompanied by an animal. If the value of the animal accompanying column is "0", it represents that a person is not accompanied by an animal. If the value is "1", it represents that a person is accompanied by an animal.

The second data will be described next. The data analysis unit 342 also creates information about each processing of a

TABLE 1

| ID | Image Capturing Camera | Person_ID | Sex | Height | Age | Group | Body Direction | Clothes | Animal Accompanying |
|---|---|---|---|---|---|---|---|---|---|
| 00001 | in car | 01 | male | 165 | 26 | 1 | 12 | formal | 0 |
| 00001 | landing | 02 | male | 172 | 40 | 1 | 8 | business | 1 |
| 00002 | in car | 01 | female | 158 | 35 | 0 | 84 | formal | 0 |
| . | . | . | . | . | . | . | . | . | . |
| . | . | . | . | . | . | . | . | . | . |
| . | . | . | . | . | . | . | . | . | . | series of processes of the elevator from a call to get-in/get-off. Table 2 shows an example of the data.

TABLE 2

| ID | Date/Time | Cultural Region of Installation Place | Image in Car |
|---|---|---|---|
| 00001 | 20190708T15:23:12 | Japan | 00001.bmp |
| 00002 | 20190708T15:42:36 | Japan | 00002.bmp |
| 00003 | 20190708T16:01:50 | Japan | 00003.bmp |
| . | . | . | . |
| . | . | . | . |
| . | . | . | . |

An ID column represents a unique ID (identification information) for each series of processes from a call to get-in/get-off, and is the same as the column of the same name in Table 1. A date/time column represents a date/time when analysis is performed. Here, a date/time when the data collection server 104 performs analysis is recorded. Since knowing the time zone in which the series of processes from a call of an elevator to get-in/get-off is performed suffices, the date/time need not always be the date/time of analysis. A calling date/time, an image capturing date/time, or the like may be applied. A cultural region column of an installation place represents the cultural region of the place where the elevator is installed. Since this information never changes once an elevator is installed, the same information is input every time. In the example of Table 2, the cultural region is "Japan". However, the classification of the cultural region is not particularly limited. For example, the scale of the cultural region may be a country basis or a region basis. An intra-car image column represents an image captured by the intra-car camera 102. Note that although a bitmap file (extension: bmp) is shown as an image format, another format may be used. Note that Table 2 may include elevator configuration information in addition to the above-described information. As an example of the configuration information, the number of cars, the moving speed of the car, the capacity of the car, and the size of the car (the depth, the door size, and the like) may be used.

The third analysis data will be described. The data analysis unit 342 determines whether a waiting passenger has got in the car based on a video of a get-in/get-off state of users, which is captured by the intra-car camera 102 after the arrival of the car at the calling floor for each series of processes from a call to get-in/get-off. Table 3 shows an example of the data managed by the data storage unit 343.

TABLE 3

| ID | Presence/Absence of Get-in of Waiting Passenger |
|---|---|
| 00001 | 1 |
| 00002 | 0 |
| 00003 | 1 |
| . | . |
| . | . |
| . | . |

An ID column represents a unique ID (identification information) for each series of processes from a call to get-in/get-off, and is the same as the column of the same name in other tables. Identical IDs indicate the same processing of an elevator from a call to get-in/get-off. For example, rows having the same ID in Table 3 represent an analysis result of data obtained by the same series of processes from a call to get-in/get-off. A presence/absence of get-in of waiting passenger column represents, as a determination result by the data analysis unit 342, whether at least one waiting passenger has got in. As an example, if at least one waiting passenger has got in, "1" is set. If no waiting passenger has got in, "0" is set.

Every time image data and video data transmitted from the landing camera 101 and the intra-car camera 102 via the data reception unit 341 are received, the data analysis unit 342 performs analysis. The data analysis unit 342 records analysis data created as an analysis result in the data storage unit 343. The analysis data providing unit 344 transmits the analysis data accumulated in the data storage unit 343 to the estimation server 105.

The estimation server 105 is configured to include the estimation result transmission unit 355, a learning data generation unit 354, a learning unit 353, an estimation input data generation unit 352, and an estimation unit 351. The learning data generation unit 354 receives data from the analysis data providing unit 344 of the data collection server 104, and processes and edits the data into a form suitable for learning. The data structure of data (learning data) used for learning is not particularly limited, and may be defined in accordance with, for example, a learning model to be used. The learning data generation unit 354 creates learning data to be used to perform learning for the learning model from the information of Tables 1 and 2.

In this embodiment, as an example of creating learning data in which pieces of information having the same ID are put into a group such that the number of rows always becomes constant, examples of learning data are shown in Tables 4 and 5.

TABLE 4

| ID | 00001 | 00002 | 00003 | ... |
|---|---|---|---|---|
| Number of Male Waiting Passengers | 2 | 5 | 0 | ... |
| Number of Female Waiting Passengers | 3 | 3 | 1 | ... |
| Height of Waiting Passenger: ~139 | 0 | 0 | 0 | ... |
| Height of Waiting Passenger: 140~149 | 1 | 0 | 0 | ... |
| Height of Waiting Passenger: 150~159 | 2 | 2 | 1 | ... |
| Height of Waiting Passenger: 160~169 | 2 | 4 | 0 | ... |
| Height of Waiting Passenger: 170~179 | 0 | 1 | 0 | ... |
| Height of Waiting Passenger: 180~ | 0 | 1 | 0 | ... |
| Age of Waiting Passenger: ~19 | 0 | 0 | 0 | ... |
| Age of Waiting Passenger: 20~29 | 1 | 2 | 1 | ... |
| Age of Waiting Passenger: 30~39 | 3 | 2 | 0 | ... |
| Age of Waiting Passenger: 40~49 | 1 | 2 | 0 | ... |
| Age of Waiting Passenger: 50~59 | 0 | 1 | 0 | ... |
| Age of Waiting Passenger: 60~69 | 0 | 1 | 0 | ... |
| Age of Waiting Passenger: 70~79 | 0 | 0 | 0 | ... |
| Age of Waiting Passenger: 80~ | 0 | 0 | 0 | ... |
| Ratio of Persons Included in Group of Waiting Passengers | 0.4 | 0.5 | 0 | ... |
| Clothes of Waiting Passenger: Business | 1 | 6 | 0 | ... |
| Clothes of Waiting Passenger: Formal | 0 | 0 | 1 | ... |
| Clothes of Waiting Passenger: Casual | 4 | 2 | 0 | ... |
| Animal Accompanying Waiting Passenger | 0 | 0 | 1 | ... |
| Number of Waiting Passengers | 5 | 8 | 1 | ... |

TABLE 5

| ID | 00001 | 00002 | 00003 | ... |
|---|---|---|---|---|
| Number of Male Passengers | 1 | 1 | 2 | ... |
| Number of Female Passengers | 0 | 3 | 1 | ... |
| Height of Passenger: ~139 | 0 | 1 | 0 | ... |
| Height of Passenger: 140~149 | 1 | 1 | 1 | ... |
| Height of Passenger: 150~159 | 0 | 0 | 0 | ... |
| Height of Passenger: 160~169 | 0 | 2 | 2 | ... |
| Height of Passenger: 170~179 | 0 | 0 | 0 | ... |
| Height of Passenger: 180~ | 0 | 0 | 0 | ... |
| Age of Passenger: ~19 | 0 | 0 | 0 | ... |
| Age of Passenger: 20~29 | 0 | 3 | 0 | ... |
| Age of Passenger: 30~39 | 1 | 1 | 0 | ... |
| Age of Passenger: 40~49 | 0 | 0 | 1 | ... |
| Age of Passenger: 50~59 | 0 | 0 | 2 | ... |
| Age of Passenger: 60~69 | 0 | 0 | 0 | ... |
| Age of Passenger: 70~79 | 0 | 0 | 0 | ... |
| Age of Passenger: 80~ | 0 | 0 | 0 | ... |
| Ratio of Persons Included in Group of Passengers | 0 | 0.75 | 1 | ... |
| Direction of Body of Passenger: 0~45° | 1 | 2 | 2 | |
| Direction of Body of Passenger: 45°~90° | 0 | 1 | 1 | |
| Direction of Body of Passenger: 90°~ | 0 | 1 | 0 | |
| Clothes of Passenger: Business | 1 | 2 | 1 | ... |
| Clothes of Passenger: Formal | 0 | 0 | 2 | ... |
| Clothes of Passenger: Casual | 0 | 2 | 0 | ... |
| Animal Accompanying Passenger | 0 | 0 | 0 | ... |
| Number of Passengers | 1 | 4 | 3 | ... |
| Date/Time | 20190708T15:23:12 | 20190708T15:42:36 | 20190708T16:01:50 | |
| Cultural Region | Japan | Japan | Japan | |
| Intra-Car Image | 00001.bmp | 00002.bmp | 00003.bmp | |

One column of each record associated with an ID corresponds to one series of processes from a call to get-in/get-off. An ID row is the same as the ID columns in Tables 1 to 3. The rows of the number of males, the number of females, the height, the age, and the clothes for waiting passengers and passengers represent how many waiting passengers or passengers having the values of the corresponding columns in Table 1 exist in each category. The ratio of persons included in each of the groups of waiting passengers and passengers represents the ratio of persons included in the group to the number of persons on the landing or in the car. The animal accompanying columns of waiting passengers and passengers represent whether a person accompanied by an animal is included in the persons on the landing or in the car. A passenger direction row represents how many persons are included in each of ranges of passenger body direction angles of 0° to 45°, 45° to 90°, and 90° or more in the car. The date/time row, the cultural region row, and the intra-car image row have the values and image data of the columns of the same names in Table 2.

The learning unit 353 performs machine learning using a learning model and using the data in Tables 4 and 5 processed from Tables 1 and 2 by the learning data generation unit 354 as input data and the data in Table 3 as supervised data, thereby creating a learned model. The estimation input data generation unit 352 receives the information in Tables 1 and 2 from the analysis data providing unit 344 of the data collection server 104, converts the information into the form of Tables 4 and 5, and inputs them to the estimation unit 351. The estimation unit 351 performs estimation processing using the learned model created by the learning unit 353. The estimation unit 351 receives data processed by the estimation input data generation unit 352 as input data, and estimates whether a waiting passenger gets in the car in the situation of the input data. The estimation result is transmitted to the estimation result transmission unit 355. The estimation result transmission unit 355 transmits the estimation result received from the estimation unit 351 to the estimation result reception unit 331 of the elevator-mounted computer 103.

[Learning Model]

Figure 4:
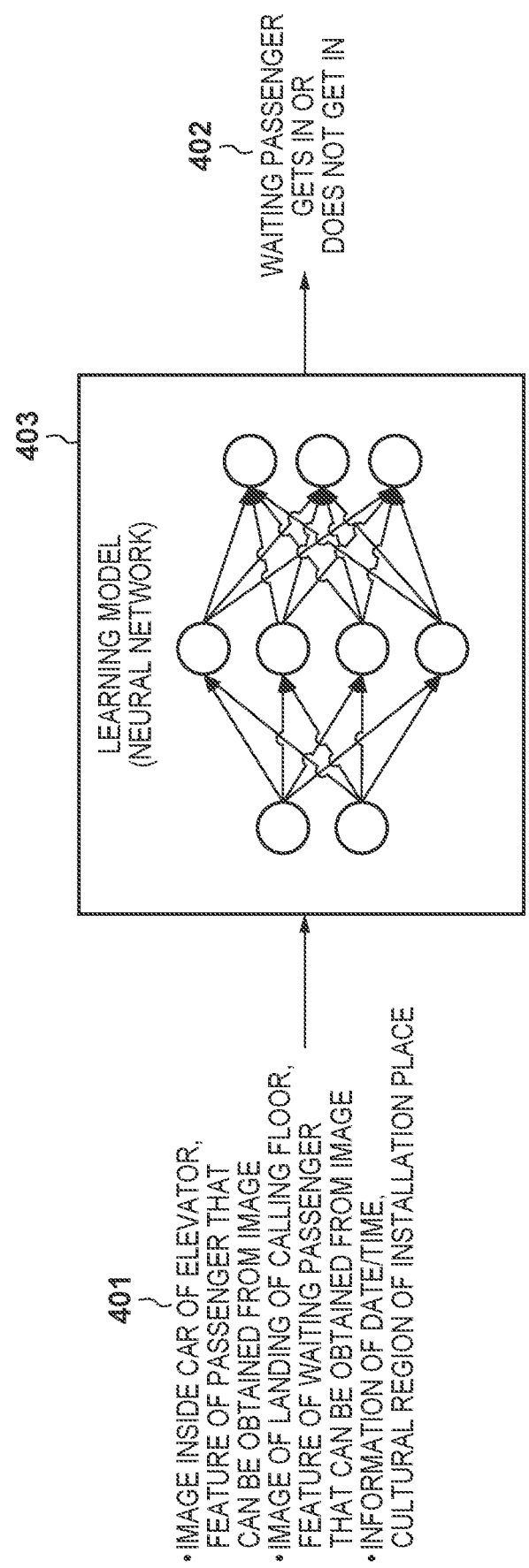
FIG. 4 is a conceptual view for explaining input/output of a learning model according to the first embodiment.

FIG. 4 is a conceptual view showing the structure of input/output using a learning model according to this embodiment. The learning unit 353 repetitively performs learning using a learning model 403, thereby generating a learned model. The learned model here may be the same as the learning model 403, or a part of the learning model 403 that has undergone learning may be used. In the following description, a model used at the time of learning will be referred to as a learning model, and a model used at the time of estimation will be referred to as a learned model.

Input data 401 is data obtained by processing image data received from the analysis data providing unit 344 by the estimation input data generation unit 352 as learning data. A method of processing analysis data into learning data by the estimation input data generation unit 352 will be described later. Output data 402 is an estimation result representing whether a waiting passenger on a landing gets in the car of an elevator in the current situation of the features of waiting passengers on the landing and the features of passengers in the car, and the like. In this embodiment, as the estimation result, a probability that the waiting passenger gets in the car of the elevator and a probability that the waiting passenger does not get in are output.

Every time a waiting passenger calls a car to a landing, an estimation logic using a learned model is executed for the car of each elevator moving to the floor and for each calling floor. The learning model 403, that is, a machine learning algorithm is adaptive to this embodiment if it is a machine learning algorithm configured to perform classification. More specifically, a neural network, a decision tree, a support vector machine, or the like can be used.

In addition, although not illustrated in FIG. 3, the learning unit 353 may include an error detection unit and an updating unit. The error detection unit obtains the error between supervised data and output data output from the output layer of a neural network in accordance with input data input to the input layer. The error detection unit may calculate the error between the supervised data and the output data from the neural network using a loss function. Based on the error obtained by the error detection unit, the updating unit updates the coupling weight coefficient and the like between the nodes of the neural network such that the error becomes small. The updating unit updates the coupling weight coefficient and the like using, for example, backpropagation. The backpropagation is a method of adjusting the coupling weight coefficient and the like between the nodes of each neural network such that the above-described error becomes small.

[Outline of Operation]

Figure 5:
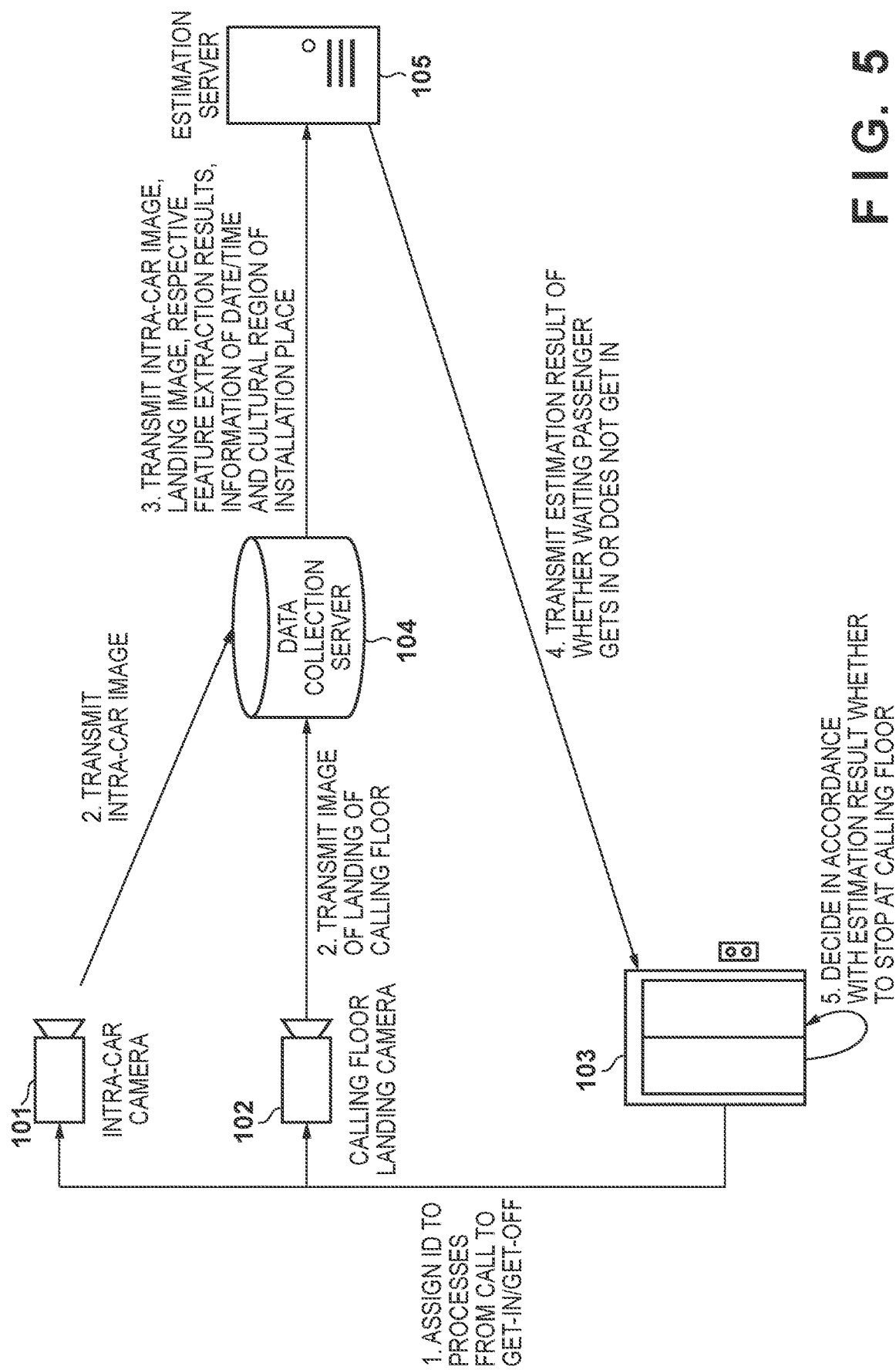
FIG. 5 is a view for explaining a motion of the elevator system according to the first embodiment.

FIG. 5 is a view showing the outline of the operation of the elevator system according to this embodiment. An operation of estimating whether a user gets in the car in the current situation of the elevator and controlling the elevator will be described here.

First, upon accepting a calling operation by a user of the elevator, the elevator-mounted computer 103 issues an ID (identification information) used to uniquely identify a series of processes from a call to get-in/get-off. Accordingly, the landing camera 101 installed in the calling floor and the intra-car camera 102 installed in the car of the elevator perform image capturing, and transmit image data obtained by the image capturing to the data collection server 104.

The data collection server 104 analyzes the image data received from the cameras, and transmits the analysis result to the estimation server 105. The analysis result includes the information as described above. The estimation server 105 performs estimation processing of applying the information received from the data collection server 104 to a learned model generated in advance by learning processing, thereby estimating whether a waiting passenger of the elevator gets in the car. As described above, in this embodiment, the probability that the waiting passenger gets in and the probability that the waiting passenger does not get in are used as the output of the estimation processing. The estimation server 105 transmits the estimation result to the elevator-mounted computer 103. The elevator-mounted computer 103 controls the operation of the car based on the estimation result received from the estimation server 105.

[Processing Procedure]

A processing procedure according to this embodiment will be described below. Note that learning processing and estimation processing to be described below can independently be executed. When performing estimation processing, a learned model is generated by learning processing before.

(Learning Processing)

FIGS. 6A to 6D are flowcharts of processing at the time of learning according to this embodiment. Processing shown in FIGS. 6A to 6D is implemented when, for example, the CPU or GPU of the main processing constituent reads out a program stored in a storage unit. Processing shown in FIGS. 6A to 6D is started as the apparatuses are activated, and is continuously executed.

Figure 6A:
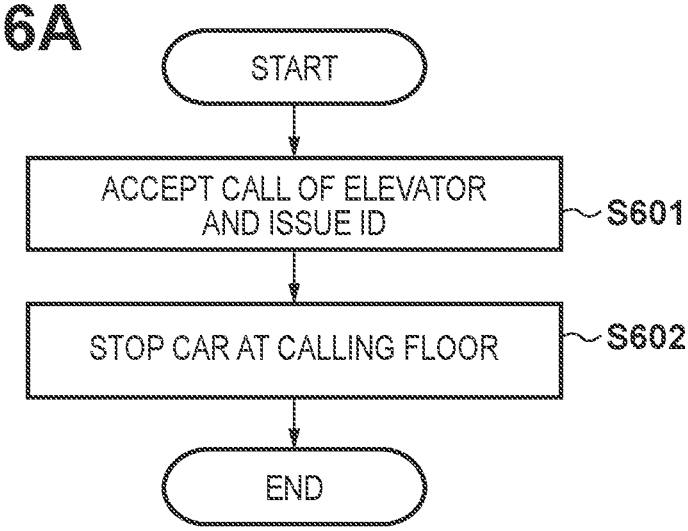
FIG. 6A is a flowchart showing learning processing of the elevator system according to the first embodiment.

FIG. 6A shows a processing procedure by the elevator-mounted computer 103 according to this embodiment.

In step S601, upon accepting a call of the car of the elevator in accordance with an operation by the user on a button or the like installed on the elevator, the ID issuance unit 333 of the elevator-mounted computer 103 issues an ID representing a series of processes from the call to get-in/get-off. The landing camera 101 and the intra-car camera 102 are notified of the issued ID in addition to the call of the car of the elevator.

In step S602, the operation control unit 332 of the elevator-mounted computer 103 ascends/descends the car to the designated floor and stops it. The operation control unit 332 then opens the door and waits until an instruction of a floor as the moving designation of the car is accepted. The processing procedure is then ended.

Figure 6B:
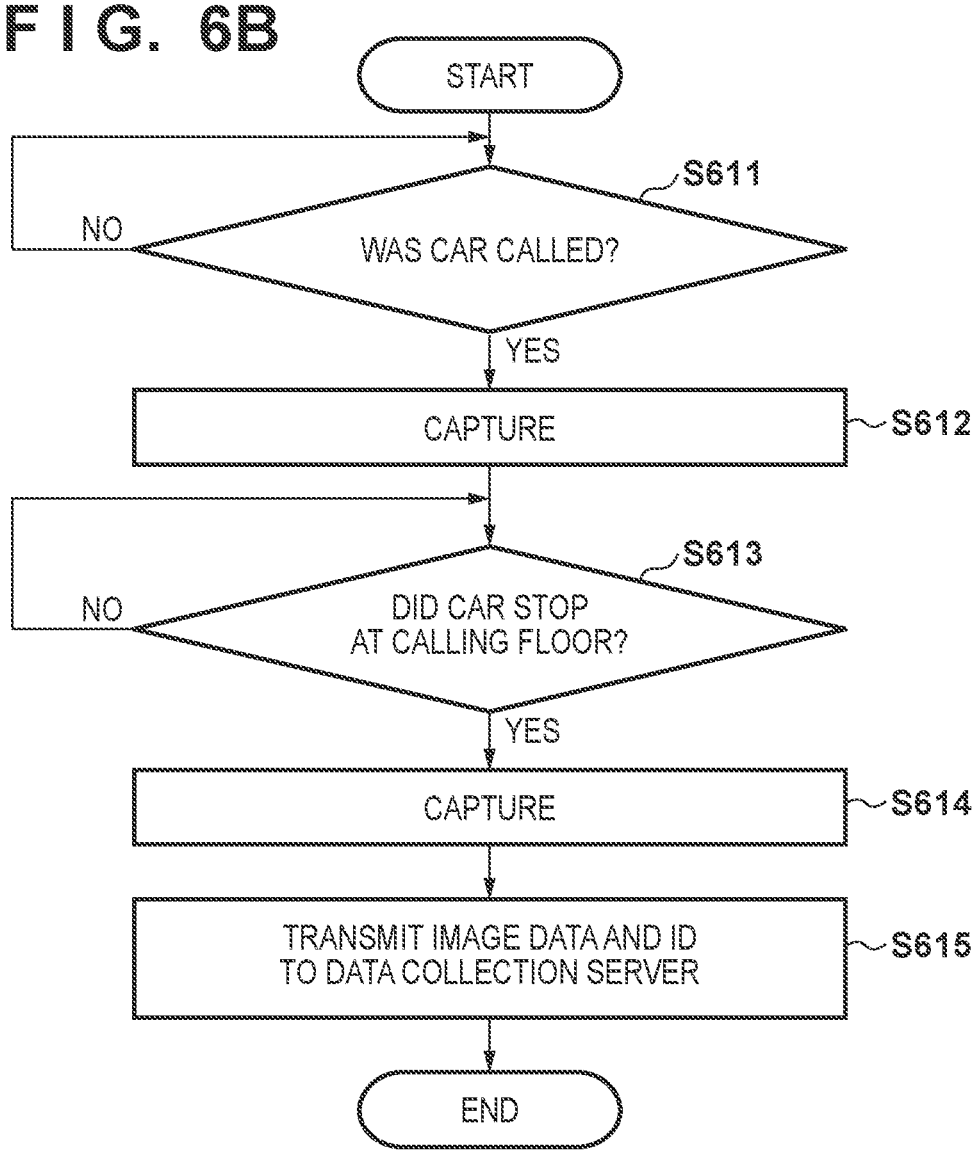
FIG. 6B is a flowchart showing learning processing of the elevator system according to the first embodiment.

FIG. 6B shows a processing procedure by the landing camera 101 and the intra-car camera 102 according to this embodiment.

In step S611, the landing camera 101 and the intra-car camera 102 determine whether the call of the car of the elevator is accepted in accordance with the operation by the user on the button or the like installed on the elevator. Operation information here may be accepted from the elevator-mounted computer 103. If the call of the car is accepted (YES in step S611), the process advances to step S612. If the call of the car is not accepted (NO in step S611), the process waits until acceptance.

In step S612, the landing camera 101 and the intra-car camera 102 capture an image of the landing of the calling floor and an image in the called car by the image capturing units 312 and 322, respectively.

In step S613, the landing camera 101 and the intra-car camera 102 determine whether the car of the elevator stops at the calling floor. If the car stops (YES in step S613), the process advances to step S614. If the car does not stop (NO in step S613), the process waits until stop.

In step S614, the landing camera 101 and the intra-car camera 102 capture an image of the landing of the calling floor and an image in the called car by the image capturing units 312 and 322, respectively.

In step S615, the image data transmission unit 311 of the landing camera 101 and the image data transmission unit 321 of the intra-car camera 102 transmit the captured images to the data collection server 104 together with the ID issued by the ID issuance unit 333 of the elevator-mounted computer 103. The processing procedure is then ended.

Figure 6C:
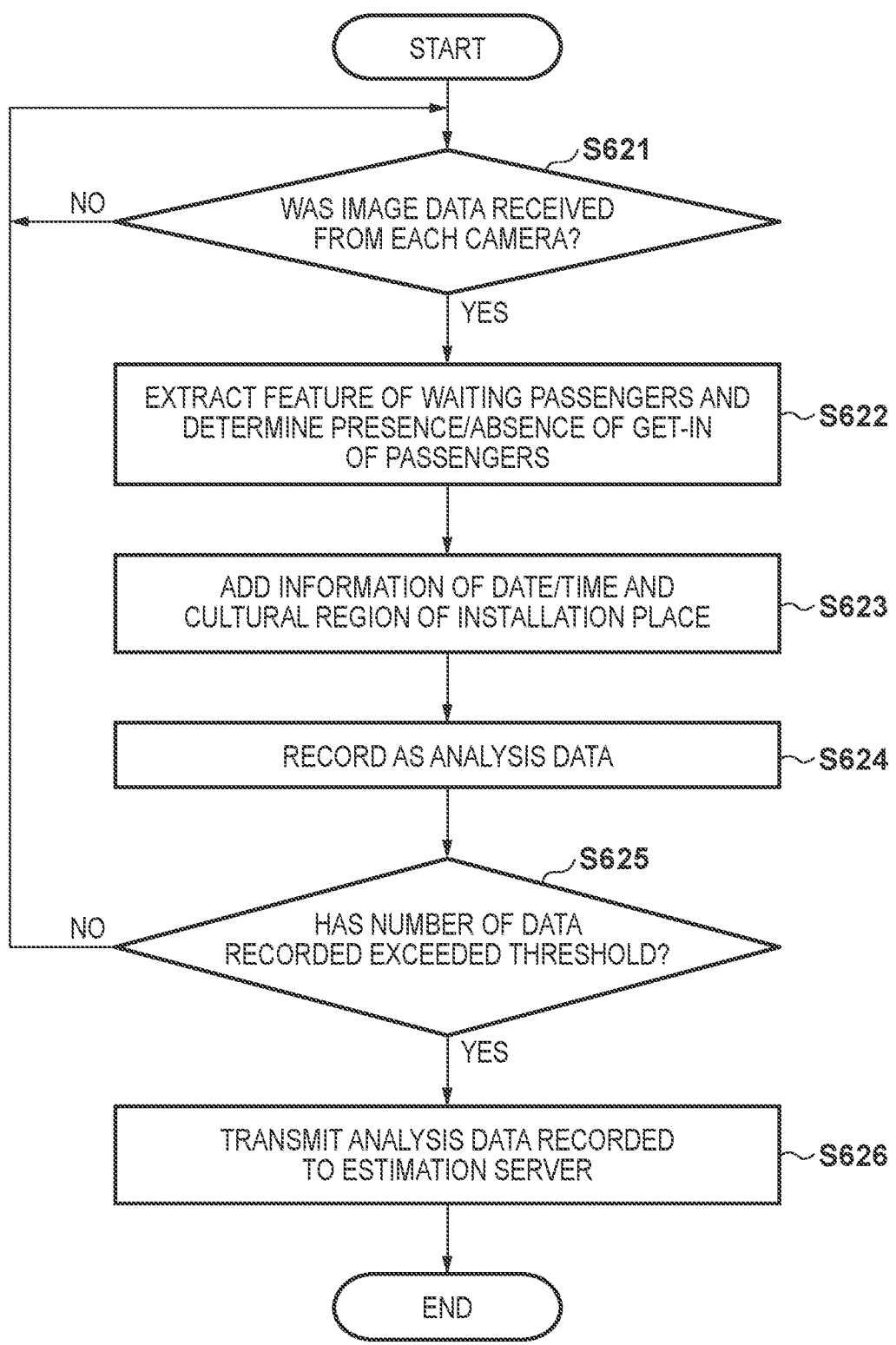
FIG. 6C is a flowchart showing learning processing of the elevator system according to the first embodiment.

FIG. 6C shows a processing procedure by the data collection server 104 according to this embodiment.

In step S621, the data collection server 104 determines whether the image data are received from the landing camera 101 and the intra-car camera 102. If the image data are received (YES in step S621), the process advances to step S622. If the image data are not received (NO in step S621), the process waits until reception.

In step S622, the data analysis unit 342 of the data collection server 104 analyzes the images corresponding to a series of processes from the call to get-in/get-off, which are received from the cameras. The data analysis unit 342 extracts the feature of each of the waiting passengers and the passengers from the images, and determines the presence/absence of get-in of a waiting passenger to the car, thereby creating data as shown in Tables 1 and 3.

In step S623, based on the information received from the cameras, the data collection server 104 creates data in Table 2 including the ID issued by the ID issuance unit 333 and the information of the date/time, the information of the cultural region of the installation place, and the image inside the car captured by the intra-car camera 102.

In step S624, the data collection server 104 records the data created in steps S622 and S623 in the data storage unit 343 as analysis data.

In step S625, the data collection server 104 determines whether the number of analysis data recorded in the data storage unit 343 has exceeded a threshold. Here, the threshold is defined in advance and held in a storage unit. Here, the threshold may be decided in accordance with the time needed for learning processing. If the number of analysis data has exceeded the threshold (YES in step S625), the process advances to step S626. If the number of analysis data has not exceeded the threshold (NO in step S625), the process returns to step S621 and waits until new image data is received.

In step S626, the data collection server 104 transmits the analysis data accumulated in the data storage unit 343 to the estimation server 105. The analysis data transmitted here may include all data that are not transmitted to the estimation server 105 yet, or a predetermined amount of data may be transmitted in accordance with a data communication load or the like. The processing procedure is then ended.

Figure 6D:
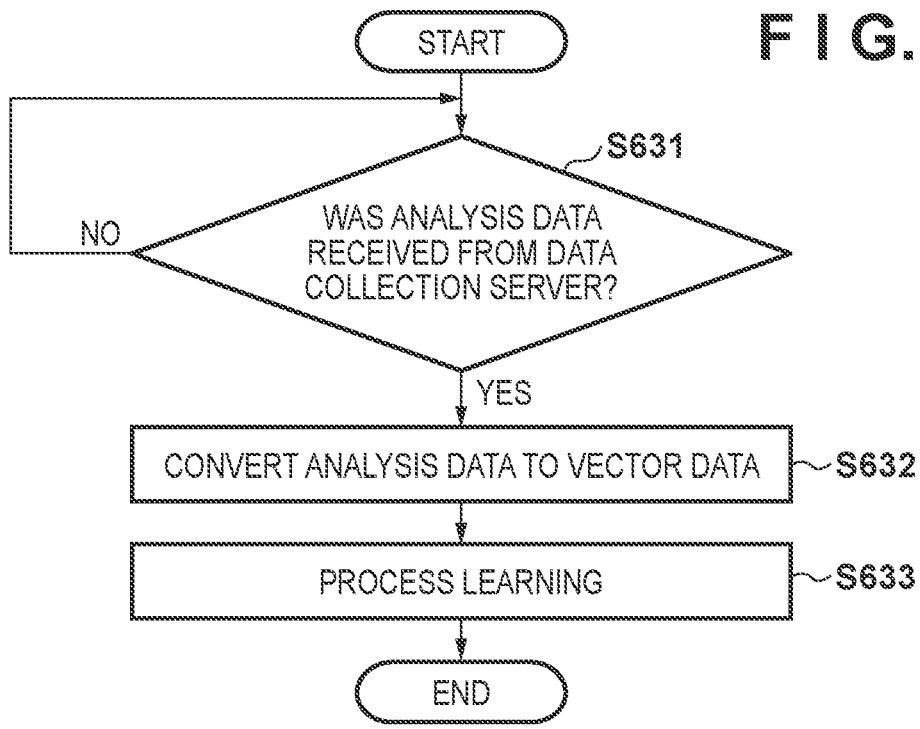
FIG. 6D is a flowchart showing learning processing of the elevator system according to the first embodiment.

FIG. 6D shows a processing procedure by the estimation server 105 according to this embodiment.

In step S631, the estimation server 105 determines whether the analysis data is received from the analysis data providing unit 344 of the data collection server 104. If the analysis data is received (YES in step S631), the process advances to step S632. If the analysis data is not received (NO in step S631), the process waits until reception.

In step S632, using the acquired analysis data, the learning data generation unit 354 of the estimation server 105 creates vector data as learning data used for learning processing. Here, vector data corresponding to data as shown in Tables 4 and 5 is generated.

In step S633, the learning unit 353 of the estimation server 105 executes machine learning by a neural network while regarding each row of learning data as shown in Tables 4 and 5 as one vector. The learning model 403 with an optimized weight or bias is thus updated, thereby performing learning. The learning result is stored in a storage unit each time. The processing procedure is then ended.

(Estimation Processing)

FIGS. 7A to 7D are flowcharts of processing at the time of estimation according to this embodiment. Processing shown in FIGS. 7A to 7D is implemented when, for example, the CPU or GPU of the main processing constituent reads out a program stored in a storage unit. Processing shown in FIGS. 7A to 7D is started as the apparatuses are activated, and is continuously executed.

Figure 7A:
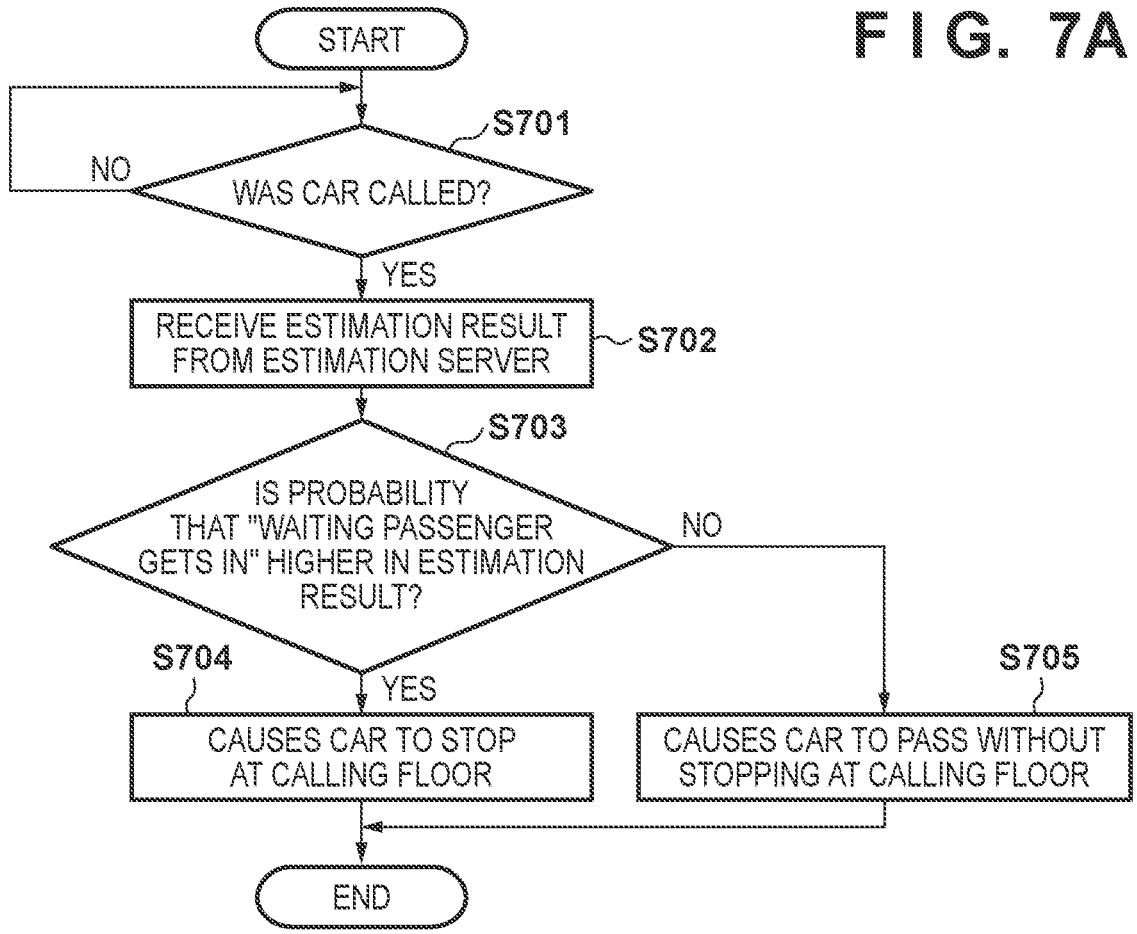
FIG. 7A is a flowchart showing estimation processing of the elevator system according to the first embodiment.

FIG. 7A shows a processing procedure by the elevator-mounted computer 103 according to this embodiment.

In step S701, the elevator-mounted computer 103 determines whether a call of the car of the elevator is accepted in accordance with an operation by the user on a button or the like installed on the elevator. If a call of the car is accepted (YES in step S701), the process advances to step S702. If a call of the car is not accepted (NO in step S701), the process waits until acceptance.

In step S702, the elevator-mounted computer 103 receives an estimation result from the estimation server 105. As for the estimation result here, the estimation server 105 performs estimation processing in accordance with the operation of the user on the button or the like installed on the elevator, and transmits the estimation result to the elevator-mounted computer 103. In this embodiment, the elevator-mounted computer 103 waits until the estimation result is received. Note that if the estimation result cannot be received even after the elapse of a predetermined time, control may be done to advance to step S704.

In step S703, the elevator-mounted computer 103 determines, based on the estimation result received in step S702, whether the probability that the waiting passenger gets in the car is higher than the probability that the waiting passenger does not get in the car. As described above, in this embodiment, the probability that the waiting passenger gets in the car and the probability that the waiting passenger does not get in the car are shown as the estimation result. If the probability that the waiting passenger gets in the car is higher than the probability that the waiting passenger does not get in the car (YES in step S703), the process advances to step S704. Otherwise (NO in step S703), the process advances to step S705.

In step S704, the elevator-mounted computer 103 controls to stop the car at the calling floor. The processing procedure is then ended.

In step S705, the elevator-mounted computer 103 controls to pass the car without stopping it at the calling floor. The processing procedure is then ended.

Figure 7B:
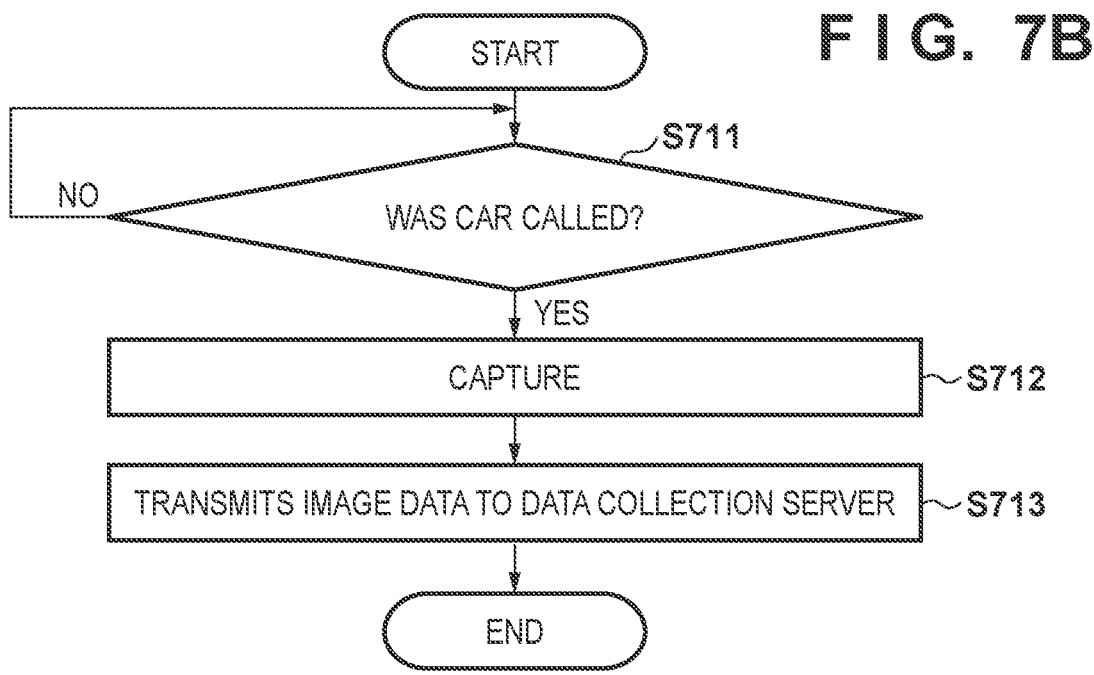
FIG. 7B is a flowchart showing estimation processing of the elevator system according to the first embodiment.

FIG. 7B shows a processing procedure by the landing camera 101 and the intra-car camera 102 according to this embodiment.

In step S711, the landing camera 101 and the intra-car camera 102 determine whether the call of the car of the elevator is accepted in accordance with the operation by the user on the button or the like installed on the elevator. Operation information here may be accepted from the elevator-mounted computer 103. If the call of the car is accepted (YES in step S711), the process advances to step S712. If the call of the car is not accepted (NO in step S711), the process waits until acceptance.

In step S712, the landing camera 101 and the intra-car camera 102 capture an image of the landing of the calling floor and an image in the called car by the image capturing units 312 and 322, respectively.

In step S713, the image data transmission unit 311 of the landing camera 101 and the image data transmission unit 321 of the intra-car camera 102 transmit the captured images to the data reception unit 341 of the data collection server 104. The processing procedure is then ended.

Figure 7C:
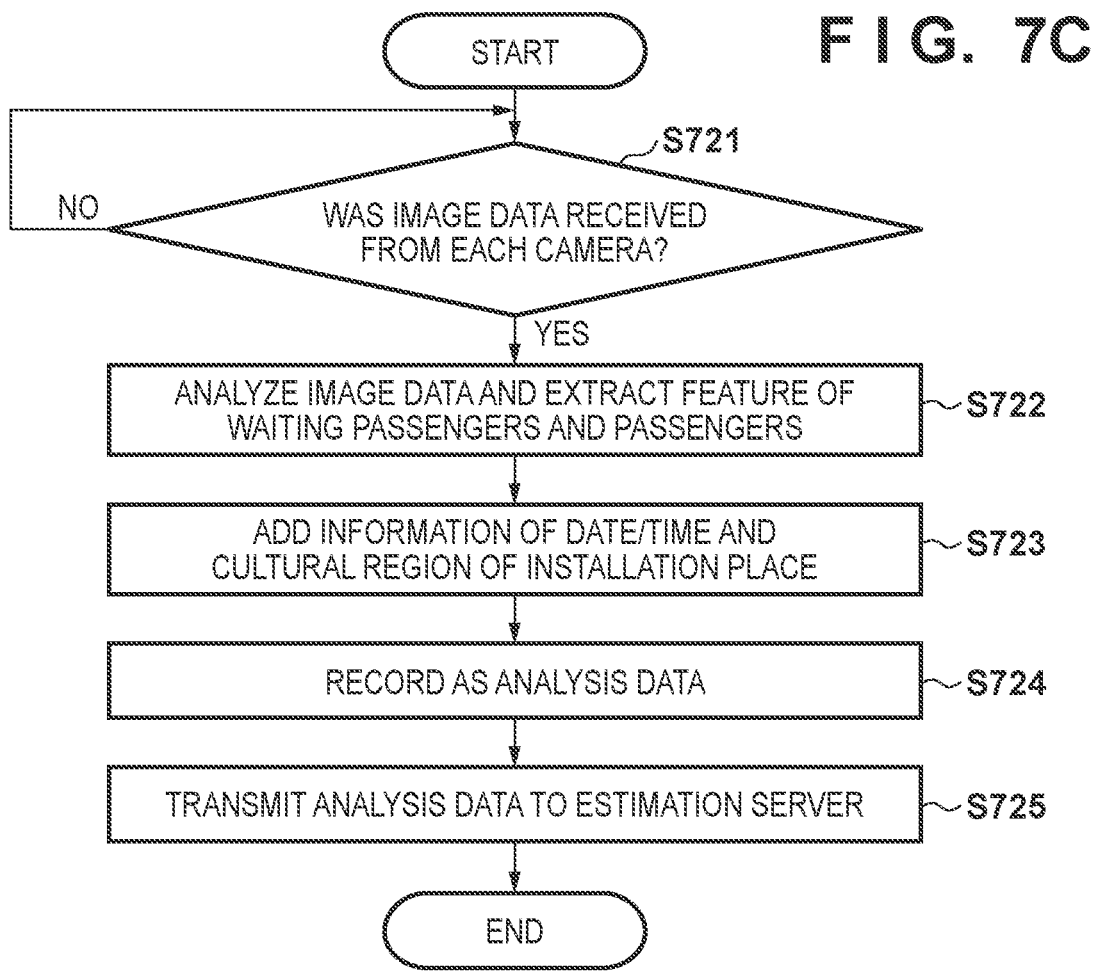
FIG. 7C is a flowchart showing estimation processing of the elevator system according to the first embodiment.

FIG. 7C shows a processing procedure by the data collection server 104 according to this embodiment.

In step S721, the data collection server 104 determines whether the image data are received from the landing camera 101 and the intra-car camera 102. If the image data are received (YES in step S721), the process advances to step S722. If the image data are not received (NO in step S721), the process waits until reception.

In step S722, the data analysis unit 342 of the data collection server 104 analyzes the image data received from the cameras, extracts the feature of each of the waiting passengers and the passengers, and creates data as shown in Table 1 as analysis data.

In step S723, based on the information stored in the data storage unit 343 and the information received from the cameras, the data analysis unit 342 of the data collection server 104 creates data shown in Table 2 including the information of the date/time and the information of the cultural region of the installation place.

In step S724, the data collection server 104 records the data created in steps S722 and S723 in the data storage unit 343 as analysis data.

In step S725, the analysis data providing unit 344 of the data collection server 104 transmits the analysis data (Tables 1 and 2) stored in the data storage unit 343 to the estimation server 105. The processing procedure is then ended.

FIG. 7D shows a processing procedure by the estimation server 105 according to this embodiment.

In step S731, the estimation server 105 determines whether the analysis data is received from the data collection server 104. If the analysis data is received (YES in step S731), the process advances to step S732. If the analysis data is not received (NO in step S731), the process waits until reception.

In step S732, using the acquired analysis data, the estimation input data generation unit 352 of the estimation server 105 creates vector data as estimation input data to be used for estimation processing. The vector data generated here has the same configuration as in Tables 4 and 5.

In step S733, the estimation unit 351 of the estimation server 105 inputs the estimation input data generated in step S732 to a learned model obtained as the result of learning processing by the learning unit 353, thereby performing estimation processing.

In step S734, the estimation result transmission unit 355 of the estimation server 105 transmits the estimation result in step S733 to the elevator-mounted computer 103. Based on the estimation result, the determination processing of step S703 in FIG. 7A by the elevator-mounted computer 103 is performed. The processing procedure is then ended.

As described above, according to this embodiment, it is possible to predict whether a waiting passenger gets in the car of the elevator. It is possible to avoid an unnecessary stop of the elevator and improve the transport efficiency based on the prediction result.

Note that in the above-described example, the probability representing whether a waiting passenger gets in or not is used as the output data of the learning model. However, the present invention is not limited to this, and, for example, a binary value representing whether a waiting passenger gets in or not may be used as the output data.

Second Embodiment

To solve the problem that the transport efficiency lowers because a waiting passenger on a landing does not get in the car of an elevator, in the first embodiment, control of passing the car through the floor is performed if it is predicted that the waiting passenger does not get in. As another solution to this problem, making waiting passengers as many as possible get in the car can be considered. For example, a situation can occur in which if the standing positions and directions of passengers in the car remain unchanged, the waiting passengers do not get in, but if the passengers in the car step back, the waiting passengers get in.

In the second embodiment of the present invention, a plurality of learned models concerning whether a waiting passenger gets in are created based on different conditions, and estimation is performed in multiple stages. In this embodiment, based on the estimation result of the first learned model, additional estimation using second and subsequent learned models of different conditions is performed. The operation, control, and processing of the elevator are changed using these estimation results.

In this embodiment, two stages of prediction are performed using two learned models. In addition to a learning model 403 shown in FIG. 4, which is created in the first embodiment, a learning model 1003 configured to predict whether a waiting passenger gets in if an announcement "please step back" is made in the car is used. First, prediction to determine whether a waiting passenger gets in the car is executed using a learned model by the learning model 403. At this time, a situation may occur in which the waiting passenger cannot get in the car if the current state of the car remains unchanged, and even if the estimation result of the learned model by the learning model 403 is "the waiting passenger does not get in", the waiting passenger can get in after passengers in the car step back. In this case, it may be effective to make an announcement to request the passengers in the car to step back.

To predict a case in which the waiting passenger does not get in if the current state of the car remains unchanged, but the waiting passenger gets in if an announcement "please step back" is made to the passengers in the car, two stages of prediction using learned models based on the two learning models 403 and 1003 are performed. For example, if as the estimation result obtained using the learned model based on the learning model 403, the probability that "the waiting passenger gets in" is 10%, and the probability that "the waiting passenger does not get in" is 90%, it is predicted that a situation in which the waiting passenger gets in never occurs even after the announcement "please step back" is made to the passengers in the car. Hence, when estimation processing ends, the estimation result by the learned model based on the learning model 403 is transmitted to an elevator-mounted computer 103.

On the other hand, assume that as the estimation result obtained using the learned model based on the learning model 403, the probability that "the waiting passenger gets in" is 45%, and the probability that "the waiting passenger does not get in" is 55%, that is, the probability that "the waiting passenger does not get in" is higher by a small margin. In this case, the waiting passenger may get in if the announcement "please step back" is made to the passengers in the car. In this case, whether the waiting passenger gets in if the announcement "please step back" is made is estimated using the learned model based on the learning model 1003.

If the probability that "the waiting passenger gets in" is higher in the estimation result of the second stage by the learned model based on the learning model 1003, it is determined that the waiting passenger does not get in in the current state, but gets in when the announcement "please move back" is made. Hence, in this embodiment, the elevator-mounted computer 103 makes the announcement "please move back" in the car and then stops the car at the calling floor. If the probability that "the waiting passenger does not get in" is higher in the estimation result of the second stage by the learned model based on the learning model 1003, it is determined that the waiting passenger does not get in even if the announcement "please move back" is made. Hence, in this embodiment, the elevator-mounted computer 103 passes the car without stopping it at the calling floor.

This embodiment will be described below with reference to the accompanying drawings. Note that a description of portions that repeat the first embodiment will be omitted, and differences will mainly be described.

[Learning Model]

Figure 10:
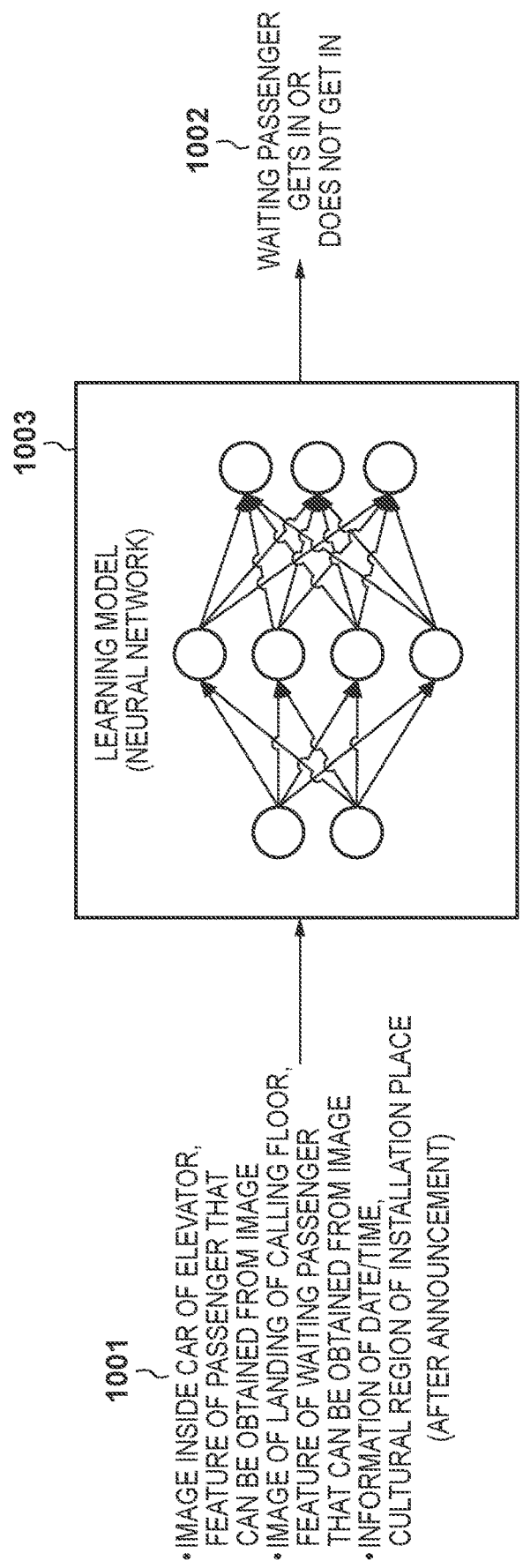
FIG. 10 is a conceptual view for explaining input/output of a learning model according to the second embodiment.

FIG. 10 is a conceptual view showing the structure of input/output using a learning model according to this embodiment. As described above, in this embodiment, another learning model 1003 is used in addition to the learning model 403 described in the first embodiment with reference to FIG. 4. A learning unit 353 of an estimation server 105 further performs learning using the learning model 1003. The configurations of input data 1001 and output data 1002 are the same as those of the input data 401 and the output data 402 shown in FIG. 4. Learning data used in learning of the learning model 1003 is based on image data in a state after an announcement as described above is made.

[Process Flow]

A process flow according to this embodiment will be described below. Note that learning processing and estimation processing to be described below can independently be executed. When performing estimation processing, a learned model is generated by learning processing before. Additionally, in this embodiment, a description will be made with focus on learning of the learning model 1003 shown in FIG. 10, and learning of the learning model 403 shown in FIG. 4 is separately performed.

(Learning Processing)

FIGS. 8A to 8D are flowcharts of processing at the time of learning according to this embodiment. Processing shown in FIGS. 8A to 8D is implemented when, for example, the CPU or GPU of the main processing constituent reads out a program stored in a storage unit. Processing shown in FIGS. 8A to 8D is started as the apparatuses are activated, and is continuously executed.

Figure 8A:
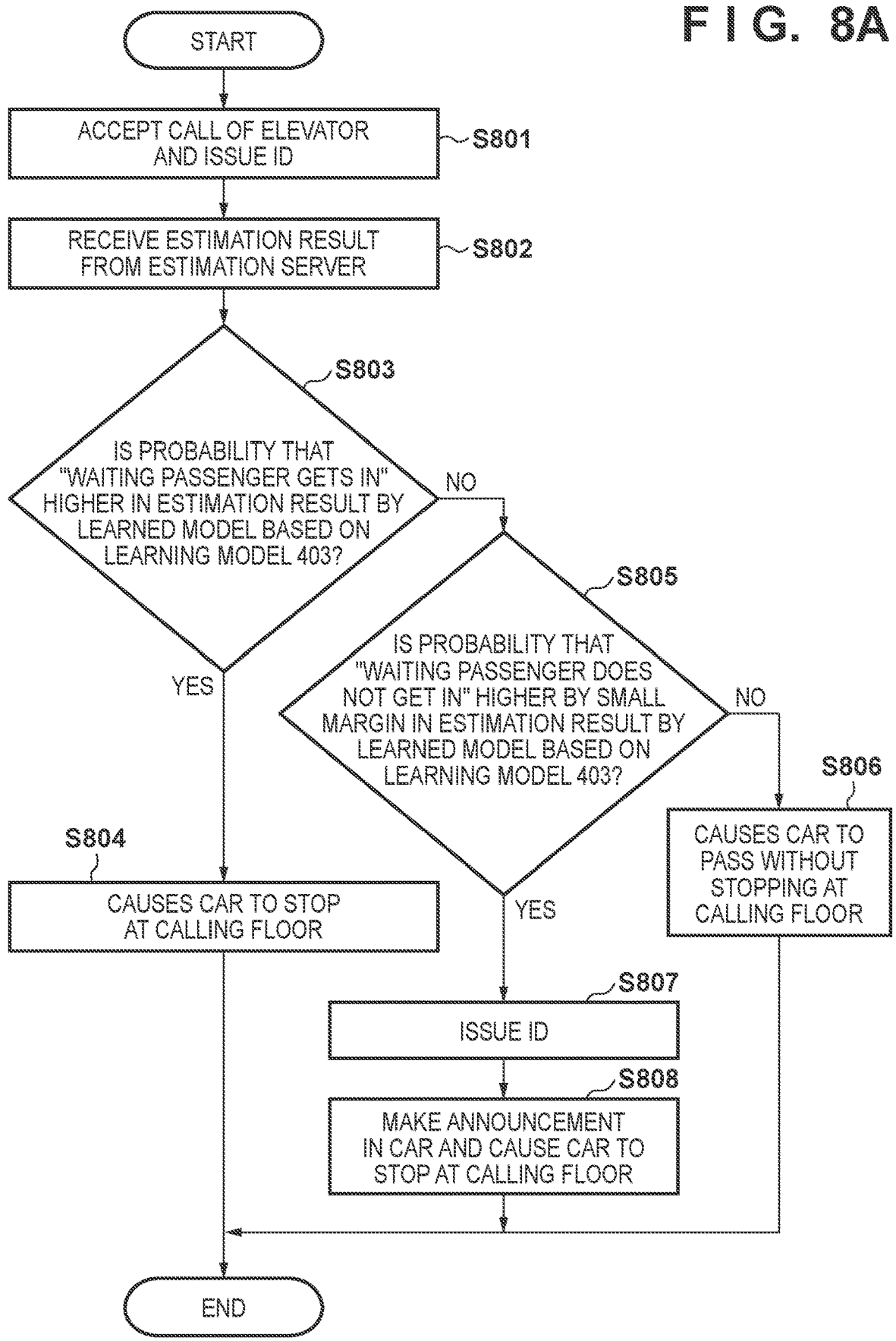
FIG. 8A is a flowchart showing learning processing of an elevator system according to the second embodiment.

FIG. 8A shows a processing procedure by the elevator-mounted computer 103 according to this embodiment.

In step S801, upon accepting a call of the car of an elevator in accordance with an operation by the user on a button or the like installed on the elevator, an ID issuance unit 333 of the elevator-mounted computer 103 issues an ID representing a series of processes from the call to get-in/get-off. A landing camera 101 and an intra-car camera 102 are notified of the issued ID in addition to the call of the car of the elevator.

In step S802, the elevator-mounted computer 103 receives an estimation result using an already generated learned model. Here, an estimation result by the learned model based on the learning model 403 shown in FIG. 4 of the first embodiment is received. That is, in this embodiment, estimation processing is performed even at the time of learning.

In step S803, the elevator-mounted computer 103 determines whether the probability that "the waiting passenger gets in" is high in the estimation result received in step S802. If the probability that "the waiting passenger gets in" is high (YES in step S803), the process advances to step S804. If the probability that "the waiting passenger does not get in" is high (NO in step S803), the process advances to step S805.

In step S804, an operation control unit 332 of the elevator-mounted computer 103 ascends/descends the car to the designated floor and stops it. The operation control unit 332 then opens the door and waits until an instruction of a floor as the moving designation of the car is accepted. The processing procedure is then ended.

In step S805, the elevator-mounted computer 103 determines whether probability that "the waiting passenger does not get in" is higher than the probability that "the waiting passenger gets in" by a small margin in the estimation result received in step S802. The estimation result is an estimation result in a case in which the passengers in the elevator are notified of a predetermined announcement (message). Here, as for "small margin", a threshold is set in advance. Hence, this determination may be performed by comparing the difference between the probability that "the waiting passenger gets in" and the probability that "the waiting passenger does not get in" with the threshold. If the probability that "the waiting passenger does not get in" is higher by a small margin (YES in step S805), the process advances to step S807. Otherwise (NO in step S805), the process advances to step S806.

In step S806, the operation control unit 332 of the elevator-mounted computer 103 passes the car without stopping it at the designated floor. At this time, the waiting passengers and the passengers may be notified that the car passes. The processing procedure is then ended.

In step S807, the ID issuance unit 333 of the elevator-mounted computer 103 issues an ID representing a series of processes from the call to get-in/get-off. The landing camera 101 and the intra-car camera 102 are notified of the issued ID in addition to a notification representing that the announcement has been made.

In step S808, the operation control unit 332 of the elevator-mounted computer 103 makes an announcement by a predetermined message in the car of the elevator. The predetermined message here is assumed to be, for example, "please move back", but any other message is also usable. The operation control unit 332 ascends/descends the car to the designated floor and stops it, opens the door, and waits until an instruction of a floor as the moving designation of the car is accepted. The processing procedure is then ended.

Figure 8B:
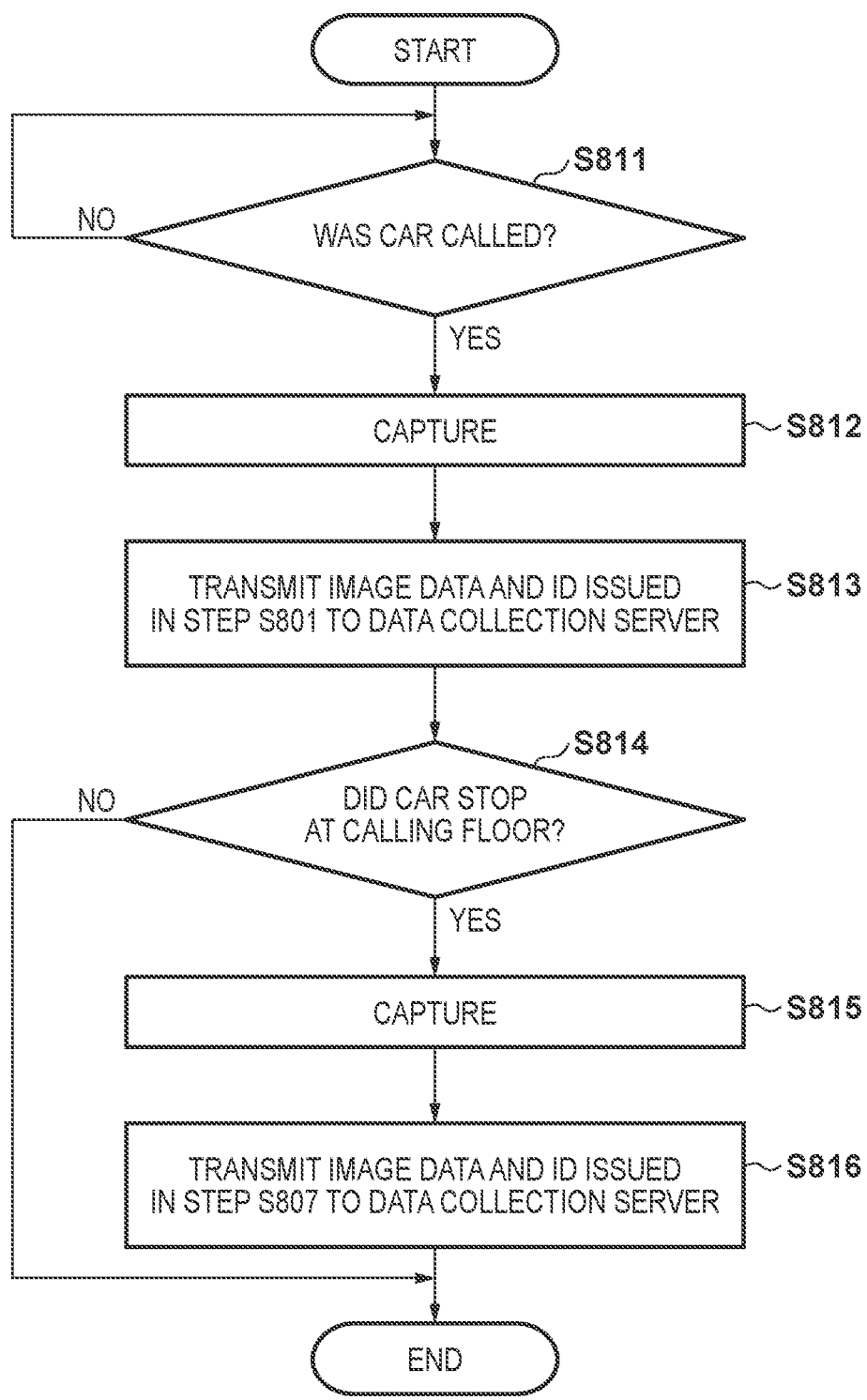
FIG. 8B is a flowchart showing learning processing of the elevator system according to the second embodiment.

FIG. 8B shows a processing procedure by the landing camera 101 and the intra-car camera 102 according to this embodiment.

In step S811, the landing camera 101 and the intra-car camera 102 determine whether the call of the car of the elevator is accepted in accordance with the operation by the user on the button or the like installed on the elevator. Operation information here may be accepted from the elevator-mounted computer 103. If the call of the car is accepted (YES in step S811), the process advances to step S812. If the call of the car is not accepted (NO in step S811), the process waits until acceptance.

In step S812, the landing camera 101 and the intra-car camera 102 capture an image of the landing of the calling floor and an image in the called car by image capturing units 312 and 322, respectively.

In step S813, the landing camera 101 and the intra-car camera 102 transmit the ID and the images captured in step S812 to a data reception unit 341 of a data collection server 104. The data transmitted here is used to obtain the estimation result to be received by the elevator-mounted computer 103 in step S802 of FIG. 8A, and the ID is the ID issued in step S801.

In step S814, the landing camera 101 and the intra-car camera 102 determine whether the car of the elevator stops at the calling floor. If the car stops (YES in step S814), the process advances to step S815. If the car does not stop (NO in step S814), the processing procedure is ended. The case in which the car does not stop corresponds to a case in which the car is passed. Image data in a case in which the announcement according to this embodiment is made cannot be acquired, and the processing is ended.

In step S815, the landing camera 101 and the intra-car camera 102 capture an image of the landing of the calling floor and an image in the called car by the image capturing units 312 and 322, respectively.

In step S816, an image data transmission unit 311 of the landing camera 101 and an image data transmission unit 321 of the intra-car camera 102 transmit the captured images to the data collection server 104 together with the ID issued by the ID issuance unit 333 of the elevator-mounted computer 103 in step S807. The processing procedure is then ended.

Figure 8C:
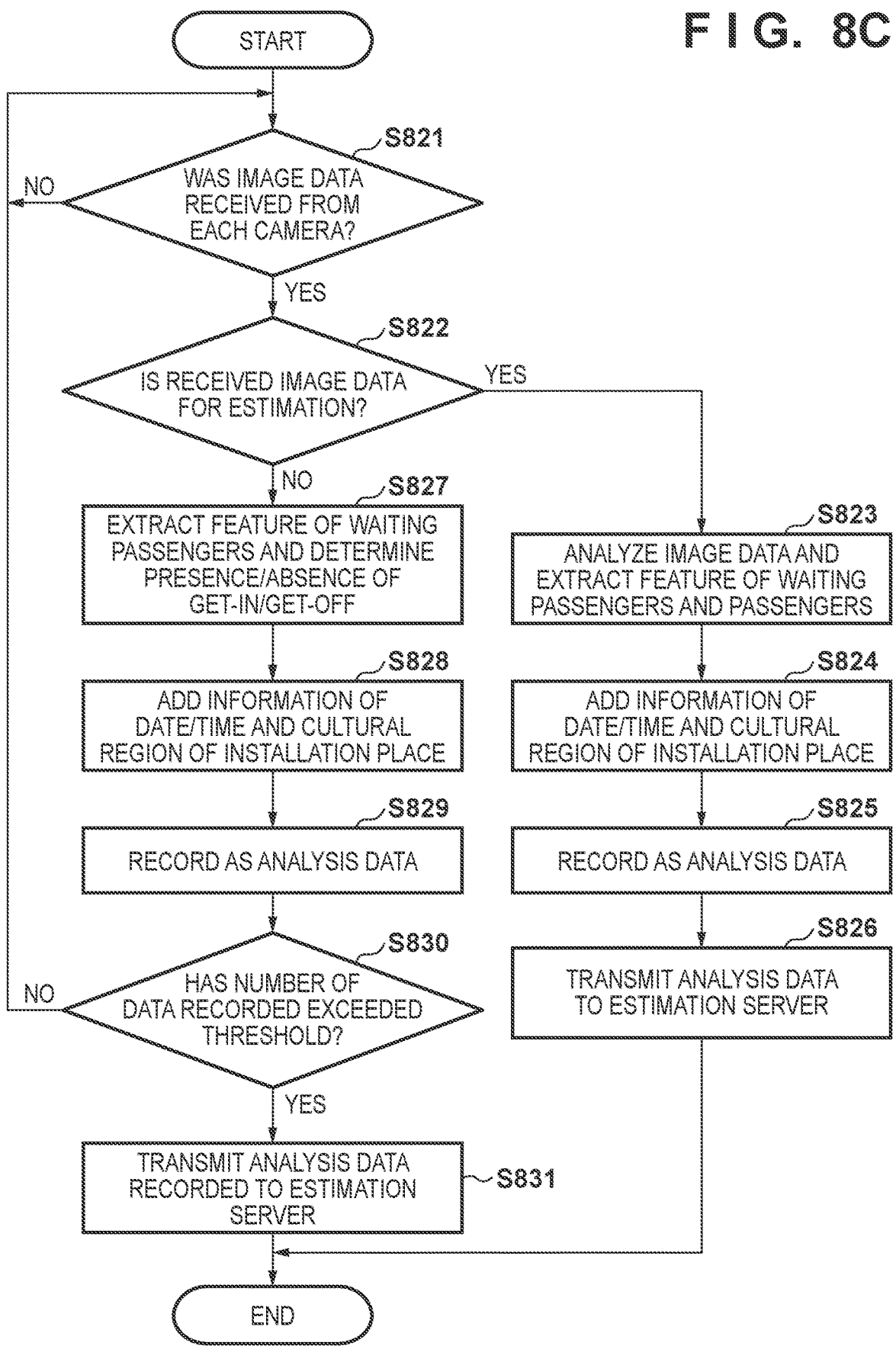
FIG. 8C is a flowchart showing learning processing of the elevator system according to the second embodiment.

FIG. 8C shows a processing procedure by the data collection server 104 according to this embodiment.

In step S821, the data collection server 104 determines whether the image data are received from the landing camera 101 and the intra-car camera 102. If the image data are received (YES in step S821), the process advances to step S822. If the image data are not received (NO in step S821), the process waits until reception.

In step S822, the data collection server 104 determines whether the received image data are image data for estimation. That is, it is determined whether the received image data are the image data transmitted in step S813 of FIG. 8B. If the image data are image data for estimation (YES in step S822), the process advances to step S823. If the image data are not image data for estimation (NO in step S822), the process advances to step S827.

In step S823, a data analysis unit 342 of the data collection server 104 analyzes the image data received from the cameras, extracts the feature of each of the waiting passengers and the passengers, and creates data as shown in Table 1 as analysis data.

In step S824, based on the information stored in a data storage unit 343 and the information received from the cameras, the data analysis unit 342 of the data collection server 104 creates data shown in Table 2 including the information of the date/time and the information of the cultural region of the installation place.

In step S825, the data collection server 104 records the data created in steps S823 and S824 in the data storage unit 343 as analysis data.

In step S826, the data collection server 104 transmits the analysis data (Tables 1 and 2) stored in the data storage unit 343 to the estimation server 105 by an analysis data providing unit 344. The analysis data transmitted here may include information representing that the data is analysis data for estimation. The processing procedure is then ended.

In step S827, the data collection server 104 analyzes, by the data analysis unit 342, the images in a series of processes from the call to get-in/get-off, which are received from the cameras. The data analysis unit 342 extracts the feature of each of the waiting passengers and the passengers from the images, and determines the presence/absence of get-in of a waiting passenger to the car, thereby creating data as shown in Tables 1 and 3.

In step S828, based on the information received from the cameras, the data collection server 104 creates data in Table 2 including the ID issued by the ID issuance unit 333 and the information of the date/time, the information of the cultural region of the installation place, and the image inside the car captured by the intra-car camera 102.

In step S829, the data collection server 104 records the data created in steps S827 and S828 in the data storage unit 343 as analysis data.

In step S830, the data collection server 104 determines whether the number of analysis data recorded in the data storage unit 343 has exceeded a threshold. Here, the threshold is defined in advance and held in a storage unit. Here, the threshold may be decided in accordance with the time needed for learning processing. If the number of analysis data has exceeded the threshold (YES in step S830), the process advances to step S831. If the number of analysis data has not exceeded the threshold (NO in step S830), the process returns to step S821 and waits until new image data is received.

In step S831, the data collection server 104 transmits the analysis data accumulated in the data storage unit 343 to the estimation server 105. The analysis data transmitted here is data to be used for learning of the learning model 1003 shown in FIG. 10. The data may include all data that are not transmitted to the estimation server 105 yet, or a predetermined amount of data may be transmitted in accordance with a data communication load or the like. The processing procedure is then ended.

Figure 8D:
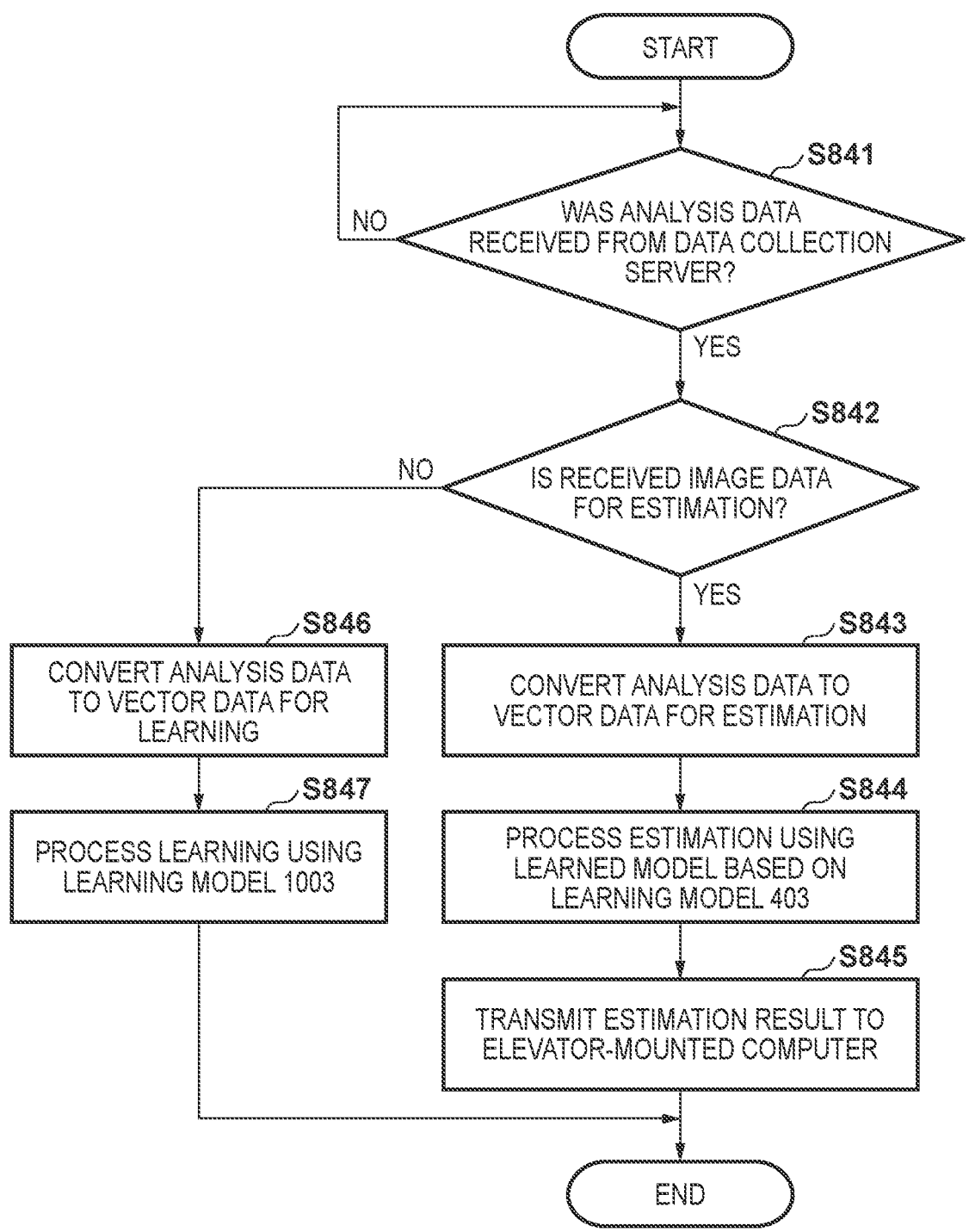
FIG. 8D is a flowchart showing learning processing of the elevator system according to the second embodiment.

FIG. 8D shows a processing procedure by the estimation server 105 according to this embodiment.

In step S841, the estimation server 105 determines whether the analysis data is received from the data collection server 104. If the analysis data is received (YES in step S841), the process advances to step S842. If the analysis data is not received (NO in step S841), the process waits until reception.

In step S842, the estimation server 105 determines whether the received analysis data is analysis data for estimation. That is, it is determined whether the analysis data is the analysis data transmitted in step S826 of FIG. 8C. If the analysis data is analysis data for estimation (YES in step S842), the process advances to step S843. If the analysis data is not analysis data for estimation (NO in step S842), the process advances to step S846.

In step S843, using the acquired analysis data, an estimation input data generation unit 352 of the estimation server 105 creates vector data as estimation input data to be used for estimation processing. The vector data generated here has the same configuration as in Tables 4 and 5.

In step S844, an estimation unit 351 of the estimation server 105 inputs the estimation input data generated in step S843 to a learned model obtained as the result of learning processing by the learning unit 353, thereby performing estimation processing. The learned model used here is a learned model obtained from the learning model 403 shown in FIG. 4.

In step S845, an estimation result transmission unit 355 of the estimation server 105 transmits the estimation result in step S844 to the elevator-mounted computer 103. The estimation result here is the estimation result received in step S802 of FIG. 8A. The processing procedure is then ended.

In step S846, using the acquired analysis data, a learning data generation unit 354 of the estimation server 105 creates vector data as learning data to be used for learning processing.

In step S847, the learning unit 353 of the estimation server 105 executes machine learning by a neural network while regarding each row of learning data as shown in Tables 4 and 5 as one vector. The learning model 1003 with an optimized weight or bias is thus updated, thereby performing learning. The learning result is stored in a storage unit each time. The processing procedure is then ended.

(Estimation Processing)

Figure 9A:
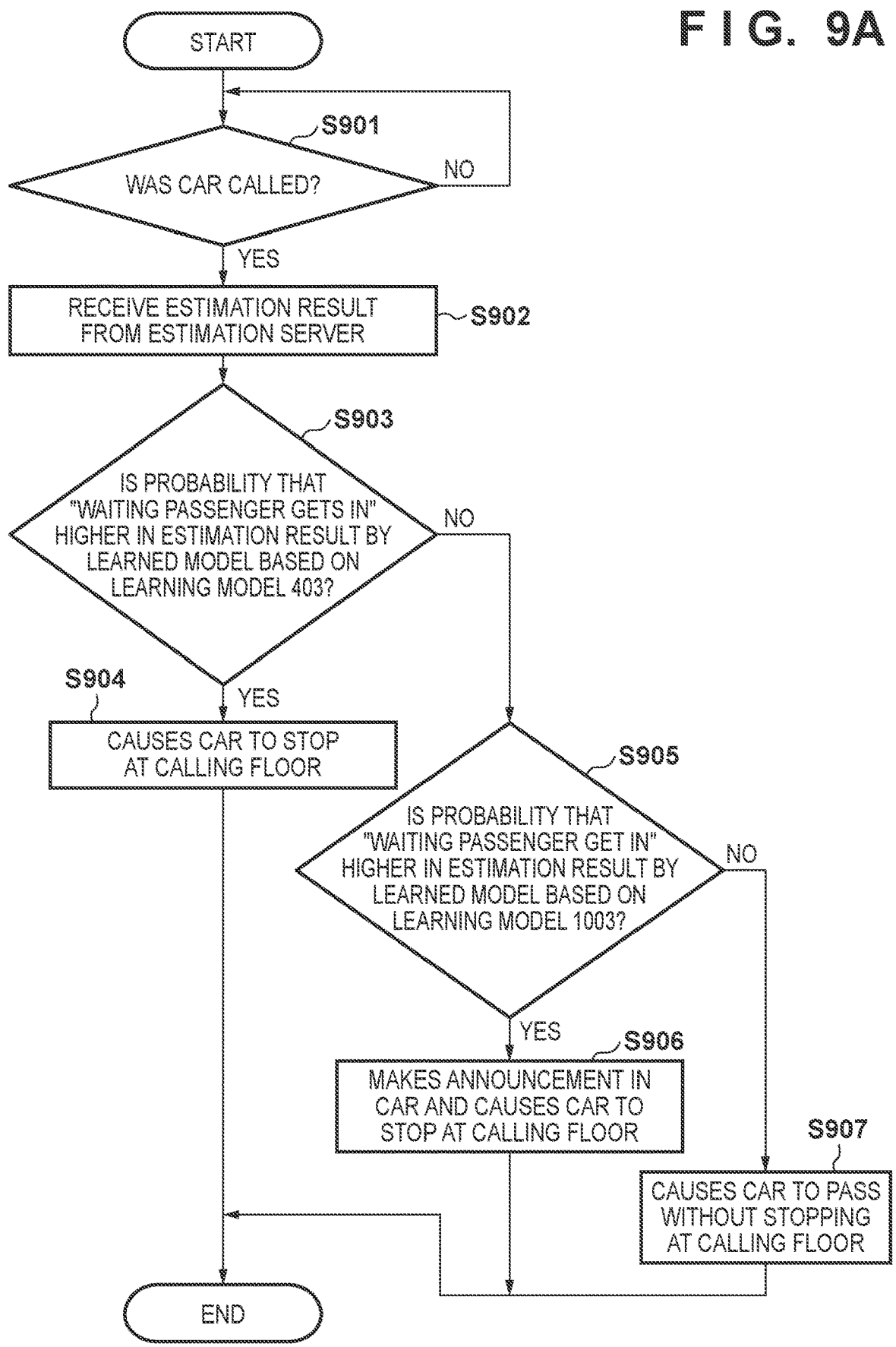
FIG. 9A is a flowchart showing estimation processing of the elevator system according to the second embodiment.
Figure 9B:
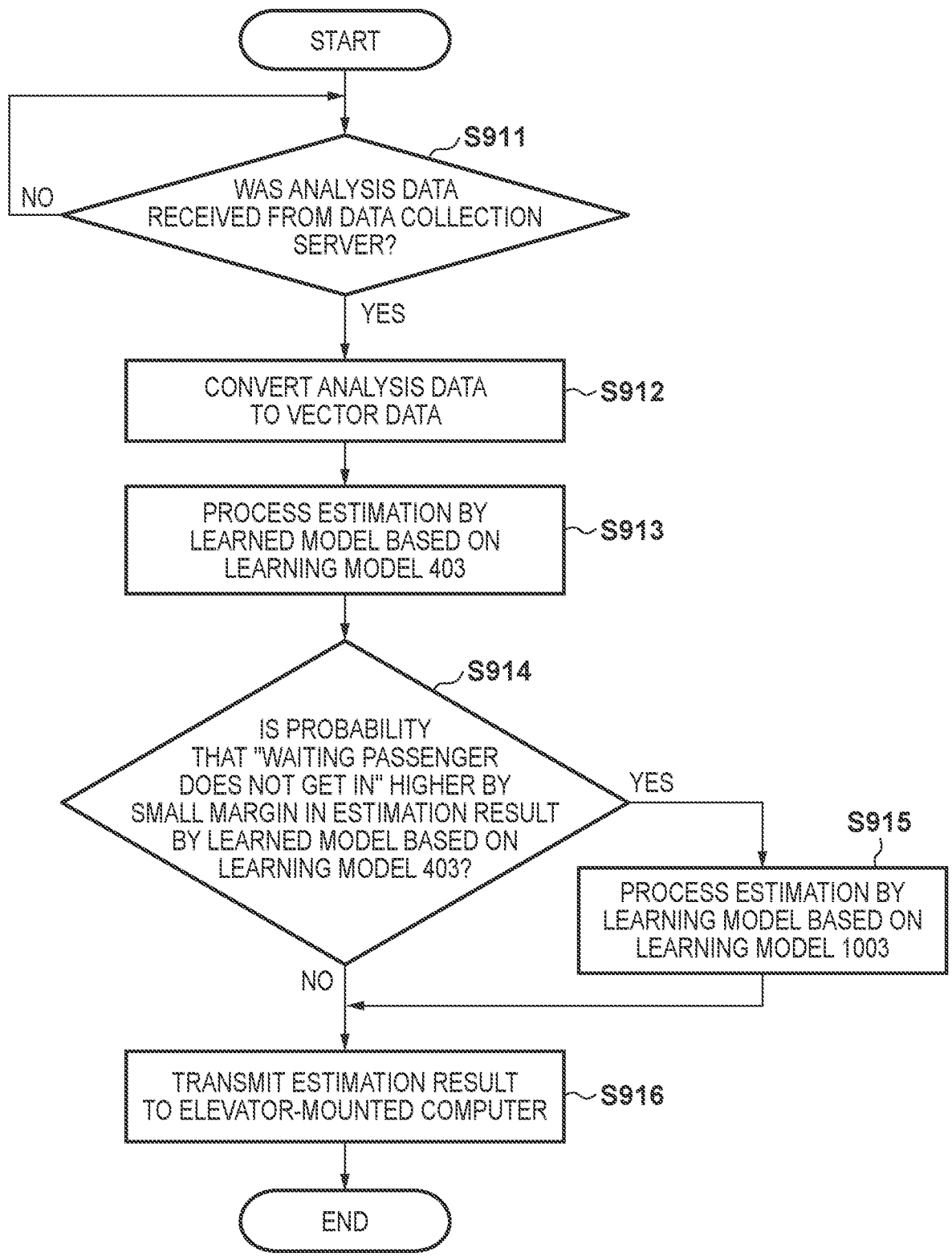
FIG. 9B is a flowchart showing estimation processing of the elevator system according to the second embodiment.

FIGS. 9A and 9B are flowcharts of processing at the time of estimation according to this embodiment. Processing shown in FIGS. 9A and 9B is implemented when, for example, the CPU or GPU of the main processing constituent reads out a program stored in a storage unit. Processing shown in FIGS. 9A and 9B is started as the apparatuses are activated, and is continuously executed. Note that the processing of the landing camera 101 and the intra-car camera 102 is the same as the processing described with reference to FIG. 7B of the first embodiment, and a description thereof will be omitted. In addition, the processing of the data collection server 104 is the same as the processing described with reference to FIG. 7C of the first embodiment, and a description thereof will be omitted.

FIG. 9A shows a processing procedure by the elevator-mounted computer 103 according to this embodiment.

In step S901, the elevator-mounted computer 103 determines whether a call of the car of the elevator is accepted in accordance with an operation by the user on a button or the like installed on the elevator. If a call of the car is accepted (YES in step S901), the process advances to step S902. If a call of the car is not accepted (NO in step S901), the process waits until acceptance.

In step S902, the elevator-mounted computer 103 receives an estimation result from the estimation server 105. As for the estimation result here, the estimation server 105 performs estimation processing in accordance with the operation of the user on the button or the like installed on the elevator, and transmits the estimation result to the elevator-mounted computer 103. In this embodiment, the elevator-mounted computer 103 waits until the estimation result is received. Note that if the estimation result cannot be received even after the elapse of a predetermined time from the acceptance of the call, the process may advance to step S904.

In step S903, the elevator-mounted computer 103 determines, in the estimation result received in step S902, whether the probability that "the waiting passenger gets in" is higher than the probability that "the waiting passenger does not get in" in the estimation result by the learned model based on the learning model 403. If the probability that "the waiting passenger gets in" is higher (YES in step S903), the process advances to step S904. If the probability that "the waiting passenger does not get in" is higher (NO in step S903), the process advances to step S905.

In step S904, the operation control unit 332 of the elevator-mounted computer 103 ascends/descends the car to the designated floor and stops it. The operation control unit 332 then opens the door and waits until an instruction of a floor as the moving designation of the car is accepted. The processing procedure is then ended.

In step S905, the elevator-mounted computer 103 determines, in the estimation result received in step S902, whether the probability that "the waiting passenger gets in" is higher than the probability that "the waiting passenger does not get in" in the estimation result by the learned model based on the learning model 1003. In this embodiment, in addition to the estimation result by the learned model based on the learning model 403, if the estimation result satisfies a predetermined condition, the estimation result by the learned model based on the learning model 1003 is also transmitted from the estimation server 105. The estimation result by the learned model based on the learning model 1003 is an estimation result in a case in which the passengers in the elevator are notified of a predetermined message. If the probability that "the waiting passenger gets in" is higher (YES in step S905), the process advances to step S906. If the probability that "the waiting passenger does not get in" is higher (NO in step S905), the process advances to step S907.

In step S906, the operation control unit 332 of the elevator-mounted computer 103 makes an announcement by a predetermined message in the car of the elevator. The predetermined message here is assumed to be, for example, "please move back", but any other message is also usable. The operation control unit 332 ascends/descends the car to the designated floor and stops it, opens the door, and waits until an instruction of a floor as the moving designation of the car is accepted. The processing procedure is then ended.

In step S907, the operation control unit 332 of the elevator-mounted computer 103 passes the car without stopping it at the designated floor. At this time, the waiting passengers and the passengers may be notified that the car passes. The processing procedure is then ended.

FIG. 9B shows a processing procedure by the estimation server 105 according to this embodiment.

In step S911, the estimation server 105 determines whether the analysis data is received from the data collection server 104. If the analysis data is received (YES in step S911), the process advances to step S912. If the analysis data is not received (NO in step S911), the process waits until reception.

In step S912, using the acquired analysis data, the estimation input data generation unit 352 of the estimation server 105 creates vector data as estimation input data to be used for estimation processing. The vector data generated here has the same configuration as in Tables 4 and 5.

In step S913, the estimation unit 351 of the estimation server 105 inputs the estimation input data generated in step S912 to a learned model obtained as the result of learning processing for the learning model 403 by the learning unit 353, thereby performing estimation processing. That is, the result of the estimation processing is an estimation result representing whether a waiting passenger gets in in a case in which an announcement is not made.

In step S914, the elevator-mounted computer 103 determines, in the estimation result in step S913, whether the probability that "the waiting passenger does not get in" is higher than the probability that "the waiting passenger gets in" by a small margin in the estimation result by the learned model. Here, as for "small margin", a threshold is set in advance. Hence, this determination may be performed by comparing the difference between the probability that "the waiting passenger gets in" and the probability that "the waiting passenger does not get in" with the threshold. As the threshold here, the same value as in step S805 of FIG. 8A may be used, or another value may be used. If the probability that "the waiting passenger does not get in" is higher by a small margin (YES in step S914), the process advances to step S915. Otherwise (NO in step S914), the process advances to step S916.

In step S915, the estimation unit 351 of the estimation server 105 inputs the estimation input data generated in step S912 to a learned model obtained as the result of learning processing for the learning model 1003 by the learning unit 353, thereby performing estimation processing. That is, the result of the estimation processing is an estimation result representing whether a waiting passenger gets in in a case in which an announcement is made. The process then advances to step S916.

In step S916, the estimation result transmission unit 355 of the estimation server 105 transmits the estimation result in step S913 to the elevator-mounted computer 103. If the estimation processing in step S915 is performed, the estimation result is also transmitted to the elevator-mounted computer 103. Based on the estimation result, the determination processing of step S903 in FIG. 9A by the elevator-mounted computer 103 is performed. The processing procedure is then ended.

Note that in this embodiment, the estimation server 105 determines, based on the estimation result before the announcement is made, whether to perform the estimation processing in a case in which the announcement is made. However, the present invention is not limited to this arrangement, and the estimation processing in a case in which the announcement is made may always be performed in consideration of the processing load or the like.

As described above, according to this embodiment, when the action of the users of the elevator based on the announcement is used as learning data, it is possible to avoid an unnecessary stop of the elevator and improve the transport efficiency, as compared to the first embodiment.

Third Embodiment

Depending on the installation place of an elevator, there are a case in which the users of the elevator are almost fixed and a case in which the users are not fixed. Detailed examples of the former are office buildings and apartments. On the other hand, detailed examples of the latter are commercial facilities and public facilities. In the former case, under a certain situation, the tendency of getting in the car of the elevator is considered to be the same every time on a user basis. However, if prediction is performed by handling the users of the elevator as different persons every time in a case in which the users are fixed, the accuracy of prediction cannot be improved.

In this embodiment, an individual user is identified and included in parameters when executing learning. In image analysis by the data analysis unit 342 of the data collection server 104 according to the first embodiment (step S622 of FIG. 6C or step S722 of FIG. 7C), not only user feature extraction but also waiting passenger face recognition is performed. Then, machine learning is performed using, as learning data, information including the action history of each user concerning getting in or not. For example, a learned model used to predict, based on the feature of each passenger in the car, whether the user gets in the car of the elevator or not is created for each user. Accordingly, when estimating whether a waiting passenger gets in the car of the elevator, if the waiting passenger on the landing can be identified by face recognition, an estimation result representing whether the user gets in can be reflected on prediction concerning whether the waiting passenger gets in the car.

As described above, in this embodiment, if the users of an elevator are fixed, learning data representing the tendency of each user is used for learning of a learning model, thereby improving the prediction accuracy.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-209829, filed Nov. 20, 2019 which is hereby incorporated by reference herein in its entirety.

What is claimed is:

1. An elevator system comprising:
at least one processor and at least one memory coupled to each other and, when a program stored in the at least one memory is executed by the at least one processor, the at least one processor acts as:
a first acquisition unit configured to acquire an image in a car of an elevator and an image of a landing of the elevator;
a generation unit configured to generate first learning data from the images acquired by the first acquisition unit;
a learning unit configured to perform learning using the first learning data, thereby generating a first learned model used to estimate whether a person on the landing of the elevator gets in the elevator;
an input data generation unit configured to generate input data from a new image including the person on the landing of the elevator acquired by the first acquisition unit;
an estimation unit configured to estimate, by applying the input data to the first learned model, whether the person on the landing of the elevator, which is included in the new image, gets in the elevator, to obtain a first estimation result indicating a probability that the person on the landing gets in the car and a probability that the person on the landing does not get in the car;
a control unit configured to control an operation of the elevator based on the first estimation result; and
a notification unit configured to make a notification in the car of the elevator;
a second acquisition unit configured to acquire an image in the car of the elevator and an image of the landing of the elevator after the notification by the notification unit has been made,
wherein the generation unit is configured to generate second learning data from the image in the car of the elevator and the image of the landing of the elevator acquired by the second acquisition unit after the notification by the notification unit has been made,
wherein the learning unit is configured to perform learning using the second learning data, thereby generating a second learned model used to estimate whether the person on the landing of the elevator gets in the elevator in a case where the notification has been made by the notification unit,
wherein the estimation unit is configured to estimate, by applying the input data generated by the input data generation unit to the second learned model, whether the person on the landing of the elevator, which is included in the new image in the case where the notification has been made by the notification unit, gets in the elevator, to obtain a second estimation result indicating a probability that the person on the landing gets in the car and a probability that the person on the landing does not get in the car in the case where the notification has been made by the notification unit, and
wherein the control unit is configured to control the notification by the notification unit based on the second estimation result of the estimation unit and control the operation of the elevator to stop the car at a floor to which the car of the elevator is called in a case where, in the second estimation result, the probability that the person on the landing gets in the car of the elevator is higher than the probability that the person does not get in.

2. The system according to claim 1, wherein the control unit is configured to control the operation of the elevator to:
stop the car at the floor to which the car of the elevator is called in a case where, in the first estimation result, the probability that the person on the landing gets in the car of the elevator is higher than the probability that the person does not get in, and
pass the car without stopping the car at the floor to which the car of the elevator is called in a case where, in the second estimation result, the probability that the person on the landing does not get in the car of the elevator is higher than the probability that the person gets in.

3. The system according to claim 1, wherein the estimation unit is configured to estimate using the second learned model to obtain the second estimation result in a case where, in the first estimation result, the probability that the person does not get in the car of the elevator is higher than the probability that the person gets in the car of the elevator, and a difference between the probability that the person on the landing gets in the car and the probability that the person on the landing does not get in the car is smaller than a predetermined threshold.

4. The system according to claim 1, wherein the first learning data and the input data include at least one of attribute information of a person in the car of the elevator, attribute information of the person on the landing, date/time information, attribute information of an installation place of the elevator, the number of persons in the car of the elevator, or attribute information of a structure of the elevator.

5. The system according to claim 4, wherein:
the generation unit is configured to identify the person in the car of the elevator and the person on the landing included in an image, and
the first learning data and the input data further include identification information of the person in the car of the elevator and identification information of the person on the landing.

6. The system according to claim 1, wherein the first acquisition unit is configured to acquire the image in the car when the car of the elevator is called, and an image of get-in/get-off on a landing of a floor to which the car of the elevator is called.

7. A control method of an elevator system, the method comprising:
acquiring an image in a car of an elevator and an image of a landing of the elevator by a camera;
generating first learning data from the acquired images;
performing learning using the first learning data, thereby generating a first learned model used to estimate whether a person on the landing of the elevator gets in the car of the elevator;
generating input data from an acquired new image including the person on the landing of the elevator;
estimating, by applying the input data to the first learned model, whether the person on the landing of the elevator, which is included in the new image, gets in the car of the elevator, to obtain a first estimation result indicating a probability that the person on the landing gets in the car and a probability that the person on the landing does not get in the car;
controlling an operation of the elevator based on the first estimation result;
making a notification in the car of the elevator;
acquiring an image in the car of the elevator and an image of the landing of the elevator after the notification has been made; and
generating second learning data from the image in the car of the elevator and the image of the landing of the elevator after the notification has been made,
wherein learning is performed using the second learning data, thereby generating a second learned model used to estimate whether the person on the landing of the elevator gets in the elevator in a case where the notification has been made,
wherein estimating is made, by applying the generated input data to the second learned model, as to whether the person on the landing of the elevator, which is included in the new image in the case where the notification has been made, gets in the elevator, to obtain a second estimation result indicating a probability that the person on the landing gets in the car and a probability that the person on the landing does not get in the car in the case where the notification has been made, and
wherein the notification is controlled based on the second estimation result and the operation of the elevator is controlled to stop the car at a floor to which the car of the elevator is called in a case where, in the second estimation result, the probability that the person on the landing gets in the car of the elevator is higher than the probability that the person does not get in.

8. A non-transitory computer-readable medium storing a program configured to cause a computer included in an elevator system to:
acquire an image in a car of an elevator and an image of a landing of the elevator by a camera;
generate first learning data from the acquired images;
perform learning using the first learning data, thereby generating a first learned model used to estimate whether a person on the landing of the elevator gets in the car of the elevator;
generate input data from an acquired new image including the person on the landing of the elevator;
estimate, by applying the input data to the first learned model, whether the person on the landing of the elevator, which is included in the new image, gets in the car of the elevator, to obtain a first estimation result indicating a probability that the person on the landing gets in the car and a probability that the person on the landing does not get in the car;
control an operation of the elevator based on the first estimation result;
make a notification in the car of the elevator;
acquire an image in the car of the elevator and an image of the landing of the elevator after the notification has been made; and
generate second learning data from the image in the car of the elevator and the image of the landing of the elevator after the notification has been made,
wherein learning is performed using the second learning data, thereby generating a second learned model used to estimate whether the person on the landing of the elevator gets in the elevator in a case where the notification has been made,
wherein the estimate is made, by applying the generated input data to the second learned model, as to whether the person on the landing of the elevator, which is included in the new image in the case where the notification has been made, gets in the elevator, to obtain a second estimation result indicating a probability that the person on the landing gets in the car and a probability that the person on the landing does not get in the car in the case where the notification has been made, and wherein the notification is controlled based on the second estimation result and the operation of the elevator is controlled to stop the car at a floor to which the car of the elevator is called in a case where, in the second estimation result, the probability that the person on the landing gets in the car of the elevator is higher than the probability that the person does not get in.

* * * * *